(12) United States Patent
Murakami et al.

(10) Patent No.: US 6,442,975 B1
(45) Date of Patent: Sep. 3, 2002

(54) METHOD OF MANUFACTURING THIN-PLATE GLASS ARTICLE, METHOD OF MANUFACTURING GLASS SUBSTRATE FOR INFORMATION RECORDING MEDIUM, AND METHOD OF MANUFACTURING MAGNETIC RECORDING MEDIUM

(75) Inventors: Akira Murakami; Takeo Otagiri; Toshio Sekiba; Shizuo Suzuki; Takumi Yata; Tetsuya Saito; Jun Saito; Katsuya Nagakura, all of Tokyo; Tomomasa Takeuchi, Saitama-ken, all of (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/391,838

(22) Filed: Sep. 8, 1999

Related U.S. Application Data

(63) Continuation-in-part of application No. 08/998,230, filed on Dec. 24, 1997, now abandoned.

(30) Foreign Application Priority Data

Dec. 26, 1996 (JP) .............................. 8-348997
Dec. 27, 1996 (JP) .............................. 8-350744
Dec. 22, 1997 (JP) .............................. 9-353097

(51) Int. Cl.[7] .......................... C03C 19/00; C03B 11/02
(52) U.S. Cl. ................ 65/61; 65/64; 65/66; 65/102; 65/106
(58) Field of Search ................ 65/66, 64, 61, 65/106, 102

(56) References Cited

U.S. PATENT DOCUMENTS 2,342,378 A    2/1944   Smith
3,244,497 A    4/1966   Copeland
3,244,776 A    4/1966   Sheldon
3,699,722 A   10/1972   Davidson et al.
3,708,921 A    1/1973   Cronkhite et al.
4,270,316 A    6/1981   Kramer et al.
5,119,258 A    6/1992   Tsai et al.
5,125,945 A    6/1992   Menihan
5,192,353 A    3/1993   Trentelman
5,228,894 A    7/1993   Sato et al.
5,236,486 A    8/1993   Blankenbecler et al.
5,441,442 A    8/1995   Haisma et al.
5,766,293 A    6/1998   Gearing
5,788,731 A    8/1998   Suzuki et al.

FOREIGN PATENT DOCUMENTS

JP    05-105458         4/1993
JP    07-133121         5/1995
JP    11-217226     *   8/1999
JP    11-228153     *   8/1999

* cited by examiner

Primary Examiner—Sean Vincent
(74) Attorney, Agent, or Firm—Frishauf, Holtz, Goodman & Chick, P.C.

(57) ABSTRACT

There are disclosed a method of manufacturing a thin-plate glass having a good flatness with a high mass productivity and a method of manufacturing a high-quality and high-performance glass substrate for an information recording medium and a magnetic recording medium with a high mass productivity. A glass gob is press-formed between upper and lower dies to form a thin-plate glass. The press forming is finished when the inside of the thin-plate glass is at a softening point Ts or a higher temperature. Subsequently, warp modification pressing is performed to modify a warp of the thin-plate glass. The warp modification pressing is finished when the inside of the thin-plate glass is at a transition point Tg or a higher temperature.

16 Claims, 15 Drawing Sheets

FIG. 5
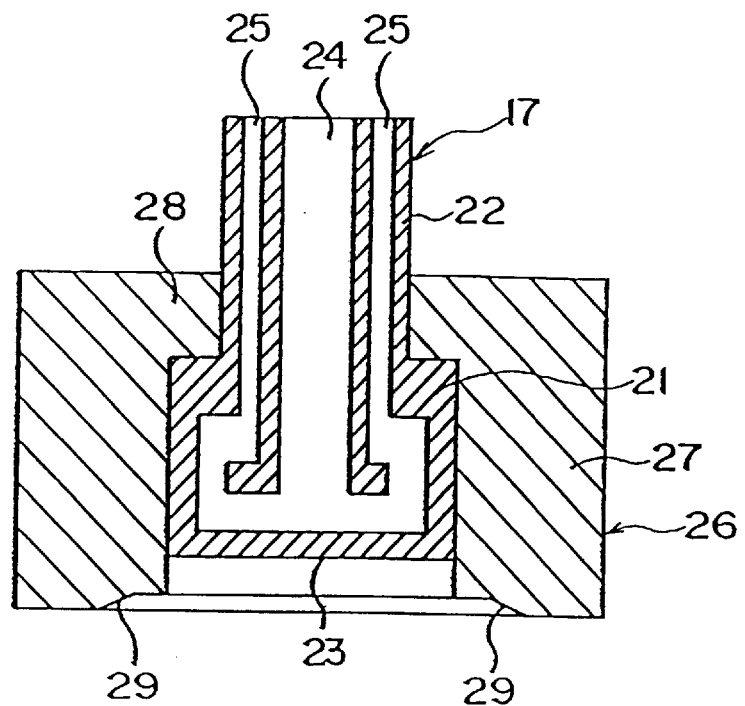
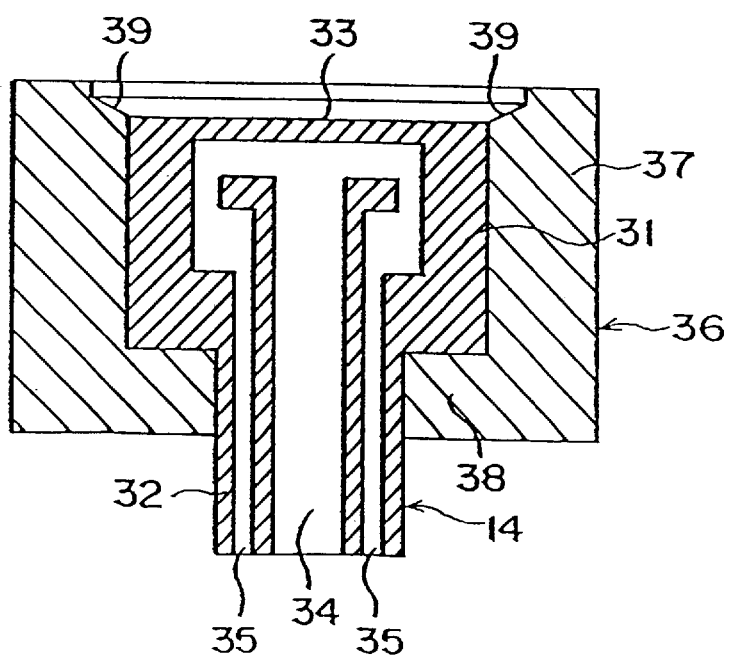

FIG. 6
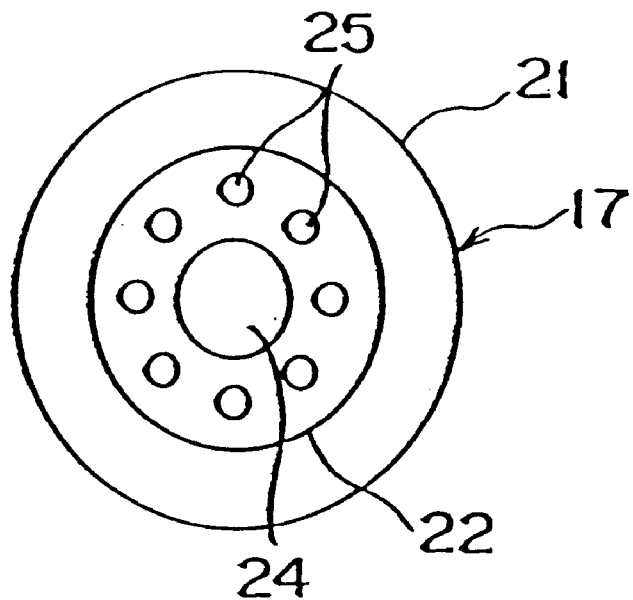
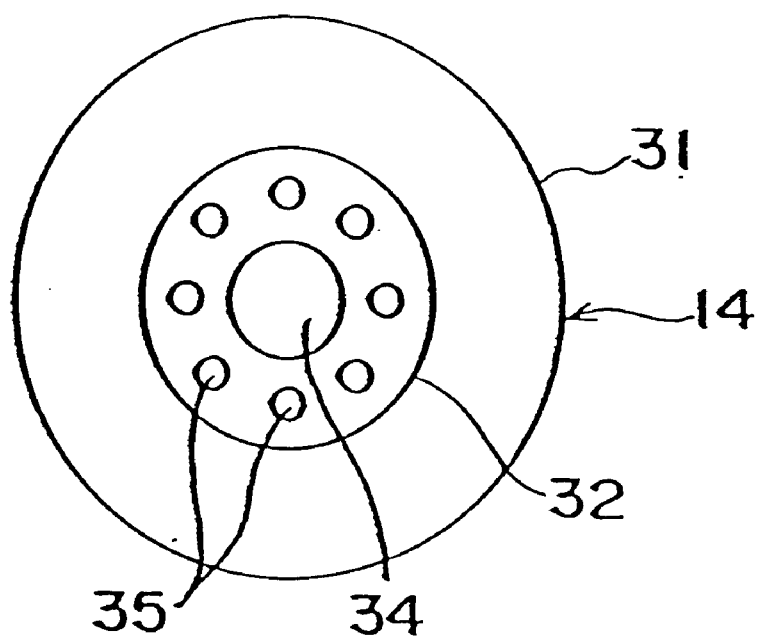

METHOD OF MANUFACTURING THIN-PLATE GLASS ARTICLE, METHOD OF MANUFACTURING GLASS SUBSTRATE FOR INFORMATION RECORDING MEDIUM, AND METHOD OF MANUFACTURING MAGNETIC RECORDING MEDIUM

REFERENCE TO RELATED APPLICATIONS

This application claims the priority right under 35 U.S.C. 119 of Japanese Patent Application No. Hei 8-348997 filed on Dec. 26, 1996, Japanese Patent Application No. Hei 8-350744 filed on Dec. 27, 1996 and Japanese Patent Application No. Hei 9-353097 filed on Dec. 22, 1997, the entire disclosure of which is incorporated herein by reference. This is a continuation-in-part of U.S. Ser. No. 08/998,230 filed Dec. 24, 1997 now abandoned.

BACKGROUND OF THE INVENTION

1. Field of the Invention

The present invention relates to a method of manufacturing by press forming a thin-plate glass with a thickness of about 3 mm or less which is used as a substrate of a magnetic recording medium, a magneto-optic recording medium, an optical recording medium and another information recording medium or as a plate glass for a camera filter, mask blanks or the like, also relates to a method of manufacturing a glass substrate for an information recording medium and further relates to a magnetic recording medium.

2. Description of Related Arts

A glass substrate has been increasingly used as a substrate for a magnetic recording medium or another information recording medium lately. Further, as a method of manufacturing the glass substrate, instead of cutting out of a plate glass, molten glass is directly pressed by using a forming die, that is, a direct pressing method is used.

A prior-art direct pressing method is disclosed in Japanese Patent Application Laid-open No. Hei 5-105458. In this method, a forming die with a die release agent layer formed on a forming face is used. A glass material is pressed for a sufficient period of time until the glass material is at a softening point or a lower temperature and is thermally in balance with upper and lower dies, to form a disc-like glass product having a final configuration with a small warp.

However, in the method described above in which the press forming is performed for a sufficient time until the glass material has a softening point or a lower temperature and brought in thermal balance with the upper and lower dies, the press forming takes much time. Thus, mass productivity is disadvantageously deteriorated.

Also, in the method disclosed in Hei 5-105458, it is difficult to control temperatures completely. The warp can be minimized only to some degree. The glass product which is obtained in the manufacture method has been heretofore able to be used as the magnetic recording medium substrate. Recently, however, a demand for densification of the magnetic recording medium has been increased. A substrate with a smaller warp than a conventional substrate is requested for. Especially, the magnetic recording medium substrate which can be used on an MR head is requested to have a high flatness. Therefore, the prior-art method may not be desirable.

Also in the method disclosed in Hei 5-105458, when manufacturing a glass substrate for the MR-head magnetic recording medium, the glass substrate needs to be finally ground and polished to conform to predetermined specifications. The grinding is performed by using a grinding plate while a pressure is applied to both side faces of a thin-plate glass. The thin-plate glass with a warp is deflected when ground. Thus, problem is that when pressure is released from both sides of the ground thin-plate glass, the thin-plate glass is again warped. To solve the problem, when the thin-plate glass is ground, the pressure to be applied thereto needs to be constantly adjusted finely so that the thin-plate glass fails to be deflected. This lengthens the grinding time. Also in this respect, the mass productivity of the thin-plate glass with a good flatness cannot be enhanced.

Another direct pressing method is disclosed in Japanese Patent Application Laid-open No. Hei 7-133121. In this method, surface temperatures of pressing faces of upper and lower dies are set to a transition point of a glass to be press-formed or its vicinity. Additionally, while inner-surface temperatures of cylindrical dies are set higher than the pressing-face surface temperatures described above, molten glass is pressed between the upper and lower dies to form a disc-like glass product close to a final product.

Also in this method, however, the obtained glass substrate needs to be ground/polished to conform to the predetermined specifications in the same manner as the method described above. For the same reason as described above, the mass productivity is deteriorated.

SUMMARY OF THE INVENTION

An object of the present invention is to provide a method of manufacturing a thin-plate glass having a good flatness with a high mass productivity. Further object is to provide a method of manufacturing a glass substrate for an information recording medium and to provide a magnetic recording medium.

To attain these and other objects, the present invention provides a method of manufacturing a thin-plate glass in which press forming is performed between a lower die onto which molten glass is supplied and an upper die which is opposed to the lower die. The press forming is performed between the lower and upper dies which are kept at a predetermined temperature. The press forming is finished when the inside of the thin-plate glass has a temperature higher than a glass transition point. Subsequently, a warp of the press-formed thin-plate glass is modified. The warp modifying process is finished when the inside of the thin-plate glass has a temperature higher than the glass transition point. To shorten the time for pressing, the press forming and the warp modification pressing are preferably finished when the temperature is higher than a glass softening point. Also, the glass temperature during the warp modifying process is preferably lower than the press forming temperature. Thus, since the pressing is finished at the temperature which is higher than the glass transition or softening points, the press-formed glass basically maintains a configuration given by forming faces of the dies even after released from the dies, and can be slightly deformed by a external force. Each pressing needs a period of time preferably within two seconds, more preferably within 1.8 seconds.

Here, the inside of the glass described above means a glass main portion covered with a surface layer which remarkably radiates heat. The temperature of the inside of the glass influences the configuration maintaining property and deformability.

Also, the thin-plate glass of the invention means a thin-plate glass substrate represented by a glass substrate for a magnetic disc. Typically, the glass has a thickness of 2 to 4 mm and a diameter and a length both of 15 cm or less.

The lower die is designed to successively go through glass gob supply process, press forming process, warp modifying process, formed product taking process and the like. For example, plural lower dies are preferably arranged on the circumference of a turntable, and the turntable is preferably rotated in such a manner that the lower dies go through the processes. The lower dies may be designed to move linearly. Also, a single lower die may be supplied to each of the processes.

On the other hand, the upper die is disposed opposite to the lower die which is positioned in the press forming process. Therefore, the number of the upper dies needs to be at least the same as the number of the lower dies for use in one press forming, but more number of the upper dies may be used. Also, a single upper die may be used on the condition that by removing the heat transferred from the molten glass to the upper die after the press forming, temperature can be controlled in a short time to allow the temperature of the upper die to reach an appropriate temperature at the time of press forming.

Subsequently, the temperature of the forming faces of the upper and lower dies (hereinafter, often referred to as the forming die) needs to be adjusted to a predetermined temperature when the press forming is started.

Here, the predetermined temperature of the forming die means the temperature adequate to form a glass material to a thin plate. The temperature is appropriately determined by glass species, thickness, glass plate size and the like.

Further, in order to adjust the temperature of the upper and lower die forming faces to the above predetermined temperature when starting the press forming, the upper and lower dies are heated or cooled as required.

As means for heating the dies used is a heating method in which plural Nichrome heaters are arranged around the lower die (upper die), an induction heating method for heating the forming die constituted of an electric conductor by supplying electricity to a coil which is disposed to surround the periphery of the lower die (upper die), a method of heating the dies with gas or the like. When plural lower dies (upper dies) are arranged, it is difficult to uniformly heat the lower dies (upper dies) with the Nichrome heaters which are arranged around the lower dies (upper dies). Because there are dispersions in temperature among the Nichrome heaters. Therefore, the induction heating method is preferable because uniform heating can be achieved. In the induction heating, since each lower die (upper die) can be heated with one coil, there is no problem of dispersion in heat supply temperature. By disposing the coil at a constant distance from the lower die (upper die), the forming die can be uniformly heated. Here, during the induction heating, a high-frequency current is preferably supplied to the coil. If a low-frequency current is supplied, a large-sized device is required. Also, since the low-frequency current is in a human audible sound region, a problem of noise arises in some case.

On the other hand, when a single lower die (upper die) is used, there is no problem of dispersion in temperature among the Nichrome heaters. Therefore, the lower die (upper die) can be heated by the Nichrome heaters arranged therearound.

Further, the temperature of the forming die in the press forming rises as compared with before the press forming. To continuously form the glass, the forming die needs to be cooled before the subsequent press forming, so that each product is formed on the equal temperature conditions. Therefore, in addition to the heating means, cooling means is necessary.

As the cooling means used is a method in which water or air is circulated in a hollow portion of the forming die, a method in which water or another liquid is blown to an inner face of the hollow portion of the forming die for vaporization or the like. In the method of blowing and vaporizing the liquid, the forming die can be cooled with the vaporization heat of the liquid. Therefore, a cooling effect can be obtained with a less amount of liquid than the method of circulating the liquid. The method using the vaporization heat of water or the like is preferable not only because the high cooling effect can be obtained but also because a cooling device can be reduced in size. Further, for example in the case where the cooling of the upper die takes so much time that after the forming the upper die cannot be cooled to the predetermined temperature before the next forming, plural upper dies may be arranged. In this case, while either one of the upper dies is used for the press forming, the other upper dies are cooled, so that the cooled upper dies can be successively used for the press forming.

In the present invention, when the press forming is finished, the temperature of the thin-plate glass is higher than the temperature of the forming die. At this time, the thin-plate glass and the forming die do not attain a thermally balanced condition. However, as aforementioned, since the forming die is kept at the predetermined temperature beforehand, the formed and cooled thin-plate glass has a fixed configuration whose warp or another quality is constant. The configuration can be easily ground/polished. Also, the thin-plate glass and the forming die need not to be cooled until they reach the thermally balanced condition. Therefore, the forming time can be shortened.

The temperatures of the upper and lower dies for use in the press forming are determined in accordance with glass type, glass releasability, die damages and the like. The temperature of the upper die is preferably between 250° C. and 450° C., and that of the lower die is preferably between 350° C. and 550° C. If the temperature is lower than the lower limitation of the die temperature, the glass will be insufficiently elongated. If it exceeds the upper limitation, the glass will be burnt to adhere to the dies.

The temperature of the upper die is preferably the same as or lower by 50 to 100° C. than the temperature of the lower die. Also, the cylindrical die for guiding the lower die and/or the upper die preferably has a temperature close to the lower-die temperature.

The lower-die temperature is preferably controlled in accordance with the warp condition of the pressed, formed and warp-modified thin-plate glass. When the completed plate glass is inwardly warped, by lowering the lower-die temperature, the glass viscosity is lowered and the subsequent warp modifying process can be performed properly. Conversely, when the glass is outwardly warped, by raising the lower-die temperature and increasing the glass viscosity in the warp modifying process, the warp can be properly modified.

Examples of the forming die for use in the press forming may include, in addition to a forming die in which the forming faces of both the upper and lower dies have flat surfaces, a forming die in which the forming faces of both the upper and lower dies have convex surfaces, and a forming die in which one of the upper and lower dies has a convex surface and the other has a concave surface. When both the upper and lower dies have the convex or concave surfaces, the thin-plate glass is obtained in which both surfaces are concave or convex. Even when the warp remains in the thin-plate glass, the glass is hardly deformed by the load of a lapping machine in a coarse grinding process.

Moreover, by designing the configurations of the forming faces in such a manner that the curvatures of upper and lower faces of the thin-plate glass are equal to each other, the polishing areas of the upper and lower faces can be equalized, and the lapping machine loads of the upper and lower faces can be equalized. Therefore, both the upper and lower faces can be set to a desired range of polishing pressures.

To form molten glass into a thin plate, the molten glass needs to be stretched in an outer peripheral direction. Therefore, by sticking a solid lubricant to the forming face of the forming die, the lubricating property of the molten glass is preferably increased. In this case, when forming the thin-plate glass, the forming die receives more heat from the molten glass as compared with when press-forming a thick-plate glass and, therefore, attains a high temperature. Therefore, the solid lubricant is preferably resistant to heat, so that it fails to lose its lubricating property even in a high-temperature region. The heat-resistant solid lubricant is not especially restricted as long as it is superior in heat resistance, but boron nitride (BN) is preferable.

Also, to obtain the remarkably thin-plate glass which is yet superior in mechanical strength, a glass material having a high melting temperature is used in some case. In this case, the temperature of the forming die is also remarkably high. Therefore, the solid lubricant is requested to have a remarkably high heat resistance. Also in this case, BN powder or another high heat-resistant solid lubricant powder is preferably used.

When the heat-resistant solid lubricant is powdered, the lubricant can uniformly stick to the glass forming face. Also, excess lubricant can be easily removed.

The material of the forming die is preferably resistant to heat. Graphite, tungsten alloy, nitride, carbide, another heat-resistant metal or the like is used. Especially, cast iron is preferable because it is superior in strength and durability.

In the invention, press-formed glass bodies are different in quantity of heat radiated through each die, which causes opposite main surfaces of the glass bodies to curve and warp.

To reduce and remove the warp, the warp modifying process of the thin-plate glass is performed. As a method for modifying the warp used is a method in which heat is taken away by blowing air or the like to either face with a higher temperature of upper and lower faces or a method in which by pressing a pair of flat boards against the press-formed glass body, the glass body is flattened by the external force (hereinafter, referred to as the warp modification pressing). When the pressure is applied to the glass body by the pair of flat boards, the upper and lower dies which have been used for the press forming can be used as the boards. The viscosity of the glass during the warp modifying process preferably has a value at which the glass maintains the press-formed configuration when no external force is applied thereto and is slightly deformed when the external force is applied.

The temperature of the flat boards for use in the warp modifying is preferably between 400° C. and 650° C. If it is lower than 400° C., defects arise in the glass. If it exceeds 600° C., the glass adheres to the boards. The temperature is preferably lower than the glass temperature by 250 to 20° C., and preferably higher than the temperature of the forming press dies by 50 to 200° C. This is because during the warp modifying process the glass temperature and viscosity are lower than those at the time of press forming. During the warp modifying, the glass needs to be prevented from cracking.

During the press forming, an amorphous molten glass is formed into a fixed configuration which is given by the inner peripheral forming face of the forming die. However, the warp modification pressing described above does not mean that the press-formed thin-plate glass is worked, but means that the warp of the thin-plate glass worked by the press forming is removed (or reduced) so that the thin-plate glass obtains a flat or substantially flat configuration. During the preferable warp modification pressing, the thin-plate glass flattened between the upper and lower dies is cooled and hardened by the pair of flat boards (or the upper and lower dies) which have a lower temperature than the glass, to modify the warp of the thin-plate glass.

The warp modification pressing is preferably performed when the inside of the thin-plate glass has a higher temperature than the glass transition point. If the warp modification pressing is performed at the glass transition point or lower temperature, the thin-plate glass tends to crack or break because the glass is excessively hard. On the other hand, if the thin-plate glass is excessively soft, the glass will be unfavorably deformed by the warp modification pressing. For this reason, the upper limitation of the temperature at which the warp modification pressing is performed is predetermined.

Even in the case where heat is taken from the face having a higher temperature out of the upper and lower faces of the press-formed thin-plate glass and a temperature difference between the upper and lower faces is reduced to modify the warp, or even in the case where the glass is deformed by the external force to modify the warp, it is important that the pressing faces of the flat boards for use be in contact with the glass as desired. Therefore, in the warp modification pressing, it is preferable to use the flat boards having the configurations conformed to the configuration of the press-formed thin-plate glass.

Here, since the temperatures of the glass and the forming die in the warp modification pressing process are different from those during the press forming, the forming die used in the press forming does not have a forming face configuration matched with the glass configuration because of its difference in thermal expansion from the glass. Therefore, it is necessary to determine the forming face configuration of the forming die in consideration of the configuration change of the forming face by the thermal expansion in the pressing temperature and the warp modification pressing temperature. For example, during the warp modification pressing, it is necessary to use the flat boards which are different in the curvature of the forming face from the forming die used in the press forming.

As described above, in order to select the configurations of the press forming upper die and the warp modification pressing flat boards in accordance with the temperature of the forming die and/or the glass during the process, it is preferable to release the upper die once from the glass after the press forming, and press the glass with a separate warp modifying flat board which has a desired forming face configuration in accordance with the temperature during the warp modification.

Here, when a pressure bearing portion described later is formed during the press forming, the warp modification pressing may be performed on both of or either one of the pressure bearing portion and a central portion surrounded by the pressure bearing portion.

Moreover, when the warp modification pressing is performed on the central portion, substantially the entire surface of the surrounded portion may be pressed, or only the selected predetermined portion may be pressed. Examples of the selected predetermined portion include a portion whose flatness is particularly to be enhanced among main surfaces of the thin-plate glass, and a main portion whose flatness determines the flatness of the entire glass.

Moreover, by performing the warp modification pressing to the pressure bearing portion, in processes such as a lapping grinding process described later the position of the board to a polishing plate is easily stabilized when the pressure by the lapping machine is received from both surfaces, and as a result the flatness after the grinding is enhanced.

For the thin-plate glass which is completed through the press forming and warp modification pressing according to the invention, warp is completely removed in some case, and warp remains in another case. If the warp can be mechanically removed by grinding and polishing, the warp may remain in the pressed or finished product.

If the warped glass substrate is simply and normally ground and polished, the finished product will still be warped. Therefore, the grinding and polishing of the warped pressed product needs to be devised.

To realize a good grinding method, the pressed product may be ground while the curvature of the pressed product is inhibited from being deformed by a load of a lapping machine. Specifically, by gradually increasing the load of the lapping machine with an elapse of time from the start of the grinding, first a flat glass substrate is formed. Subsequently, by further increasing the load, the glass substrate is ground to have a predetermined thickness.

Alternatively, to inhibit the curvature of the pressed product from being deformed, instead of forming the pressed product in a simple disc configuration, a pressure bearing portion for supporting the pressure of the lapping machine may be formed on a peripheral portion of the pressed product during the press forming. In this case, since the pressure of the lapping machine is received by the pressure bearing portion, the curved portion can be easily inhibited from being deformed.

The above grinding and polishing method for flattening the warped glass substrate can be applied to the pressed product which is obtained by the pressing method which is disclosed in Hei 5-105458 or 7-133121.

Moreover, as described above, for the thin-plate glass whose both surfaces are convex or concave, the deformation by the load of the lapping machine hardly occurs.

The thin-plate glass which is obtained by the manufacture method as described above is ground, polished and mechanically worked otherwise to form, for example, a glass substrate for an information recording medium. The grinding and polishing process is generally or roughly constituted of (1) rough machining (coarse polishing), (2) sanding (precise grinding, lapping), (3) first polishing and (4) second polishing (final polishing). If necessary, (1) the rough machining (coarse polishing) may be omitted.

Further, the glass substrate for the information recording medium constitutes a magnetic recording medium when a substrate layer, a magnetic layer, a protective layer and a lubricating layer are successively laminated on the glass substrate.

Here, as the material of the glass substrate for the magnetic recording medium used is, for example, aluminosilicate glass, soda lime glass, soda alumino-silicic acid glass, alumino-borosilicate glass, borosilicate glass, quartz glass, chain silicate glass, or crystallized glass or the like. Further preferably, the following glass composition is used.

(1) Crystallized Glass 1

The crystallized glass contains in percentages by weight 60 to 87% of $SiO_2$, 5 to 20% of $Li_2O$, 0 to 5% of $Na_2O$, 0 to 10% of $K_2O$, 0.5 to 10% in total of $Na_2O$ and $K_2O$, 0.5 to 7.5% of MgO, 0 to 9.5% of CaO, 0 to 15% of SrO, 0 to 13% of BaO, 0 to 13% of ZnO, 0 to 10% of $B_2O_3$, 0 to 10% of $Al_2O_3$, 0.5 to 8% of $P_2O_5$, 0 to 5% of $TiO_2$, 0 to 3% of $ZrO_2$, 0 to 3% of $SnO_2$, 0 to 2% in total of $As_2O_3$ and $Sb_2O_3$, and 0 to 5% as a total quantity of F of fluoride of at least one metal element in the aforementioned metal oxides. As the case may be, the crystallized glass contains 0 to 5% of at least one coloring component selected from the group consisting of $V_2O_5$, CuO, $MnO_2$, $Cr_2O_3$, CoO, $MoO_3$, NiO, $Fe_2O_3$, $TeO_2$, $CeO_2$, $Pr_2O_3$, $Nd_2O_3$ and $Er_2O_3$. The crystallized glass further contains a main crystal of lithium disilicate, and, as the case may be, α-cristobalite, α-quartz, lithium monosilicate, β-spodumene and the like. The size of crystal grain is 3.0 μm or less.

(2) Crystallized Glass 2

The crystallized glass contains in percentages by weight 45 to 75% of $SiO_2$, 4 to 30% of CaO, 2 to 15% of $Na_2O$, 0 to 20% of $K_2O$, 0 to 7% of $Al_2O_3$, 0 to 2% of MgO, 0 to 2% of ZnO, 0 to 2% of $SnO_2$, 0 to 1% of $Sb_2O_3$, 0 to 6% of $B_2O_3$, 0 to 12% of $ZrO_2$, 0 to 3% of $Li_2O$, and 3 to 12% as the total quantity of F of fluoride of at least one metal element in the aforementioned metal oxides. As the case may be, the crystallized glass contains the coloring components of $Cr_2O_3$, $Co_3O_4$ and the like and the main crystal of canasite or potassium-fluoro-Richterite. The size of crystal grain is 1.0 μm or less.

(3) Crystallized Glass 3

The crystallized glass contains in percentages by weight 35 to 60% of $SiO_2$, 10 to 30% of $Al_2O_3$, 12 to 30% of MgO, 0 to 10% of ZnO, 5 to 12% of $TiO_2$, and 0 to 8% of NiO, further contains a spinel crystal and a pyroxyene crystal as main crystals, and has a rupture modulus of 15,000 psi or more, Knoop hardness of 760 or more, and Young's modulus of $20 \times 10^6$ or more.

(4) Crystallized Glass 4

The crystallized glass contains in molecular percentages 42 to 65% of $SiO_2$, 11 to 25% of $Al_2O_3$, 15 to 33% of MgO, 5.5 to 13% of $TiO_2$, and 0 to 4% of $ZrO_2$, and contains a main crystal phase of α-quartz solid solution and enstatite, and/or enstatite solid solution.

(5) Glass 1

The glass contains in percentages by weight 62 to 75% of $SiO_2$, 4 to 18% of $Al_2O_3$, 0 to 15% of $ZrO_2$, 3 to 12% of $Li_2O$ and 3 to 13% of $Na_2O$. Alternatively, a chemical strengthening glass contains in percentages by weight 62 to 75% of $SiO_2$, 5 to 15% of $Al_2O_3$, 4 to 10% of $Li_2O$, 4 to 12% of $Na_2O$ and 5.5 to 15% of $ZrO_2$, in which the weight ratio of $Na_2O/ZrO_2$ is 0.5 to 2.0 and the weight ratio of $Al_2O_3/ZrO_2$ is 0.4 to 2.5.

(6) Glass 2

The chemical strengthening glass contains as glass components in molecular percentages 0.1 to 30% of $TiO_2$, 1 to 45% of CaO, 5 to 40% in total of MgO and the CaO, 3 to 30% in total of $Na_2O$ and $Li_2O$, less than 15% of $Al_2O_3$ and 35 to 65% of $SiO_2$.

For the purpose of enhancing shock resistance, vibration resistance and the like, a chemical strengthening process can be applied to the surface of the glass substrate by means of a low-temperature ion exchange method. The chemical strengthening method is not especially restricted as long as it is a heretofore known chemical strengthening method. For example, with respect to the glass transition point, a low-temperature chemical strengthening method or the like is preferable in which ion exchange is performed in a region which does not exceed the transition temperature. As alkali molten salt for use in the chemical strengthening, potassium nitrate, sodium nitrate or mixture nitrate of these can be used.

The substrate layer is constituted of at least one material selected from non-magnetic metals consisting of, for example, cr, Mo, Ta, Ti, W, V, B, Al and the like. When the magnetic layer is constituted mainly of Co, in order to enhance the magnetic property and the like, the substrate layer is preferably constituted of Cr simplex or Cr alloy. Also, the substrate layer is not restricted to a single layer, and can be constituted of plural identical or different layers. For example, Cr/Cr, Cr/CrMo, Cr/CrV, CrV/CrV, Al/Cr/CrMo, Al/Cr/Cr, Al/Cr/CrV, Al/CrV/CrV or another multi-layered substrate layer can be used.

As the magnetic layer, CoPt, CoCr, CoNi, CoNiCr, CoCrTa, CoPtCr, CoNiPt, or CoNiCrPt, CoNiCrTa, CoCrTaPt, CoCrPtSiO or another magnetic thin film constituted mainly of Co can be used. The magnetic layer may have a multilayered constitution (e.g., CoPtCr/CrMo/CoPtCr, CoCrTaPt/CrMo/CoCrTaPt or the like) in which the magnetic film is divided by a non-magnetic film (e.g., Cr, CrMo, CrV or the like) to reduce noise. The magnetic layer for use in a magnetic resistant head (MR head) or a great magnetic resistant head (GMR head) is constituted of the Co system alloy which includes impurity elements selected from the group consisting of Y, Si, rare earth element, Hf, Ge, Sn, Zn or oxide of these impurity elements. Alternatively, the magnetic layer has a granular structure in which Fe, Co, FeCo, CoNiPt or other magnetic particles are dispersed in a non-magnetic film constituted of ferrite system, iron-rare earth system, $SiO_2$, BN and the like. Further, the magnetic layer may use either inner-face or vertical record format.

As the protective layer, for example, a Cr film, a Cr alloy film, a carbon film, a zirconia film, a silica film or the like can be used. The protective layer can be continuously formed together with the substrate layer, the magnetic layer and the like in an in-line sputtering device. The protective layer may be constituted of a single layer or multiple layers constituted of identical or different films. Further on the aforementioned protective layer, a protective layer other than the aforementioned protective layer can be formed. For example, on the Cr film applied is a tetra-alkoxy silane diluted with alcoholic system solvent with colloidal silica particulates dispersed therein. Further, burning is performed to form a silicon dioxide ($SiO_2$) film.

The lubricating layer is formed by diluting a liquid lubricant of perfloropolyether (PEPE) with Freon system solvent or the like and applying the diluted PEPE onto the surface of the medium in dipping, spin coating or spraying method. If necessary, a heating process is performed.

BRIEF DESCRIPTION OF DRAWINGS

FIG. 5 is a sectional view showing examples of upper and lower dies in the devices of FIG. 3.

FIG. 6 shows a plan view and a lower face view of the upper and lower dies of FIG. 5.

DETAILED DESCRIPTION OF PREFERRED EMBODIMENTS

Figure 1:
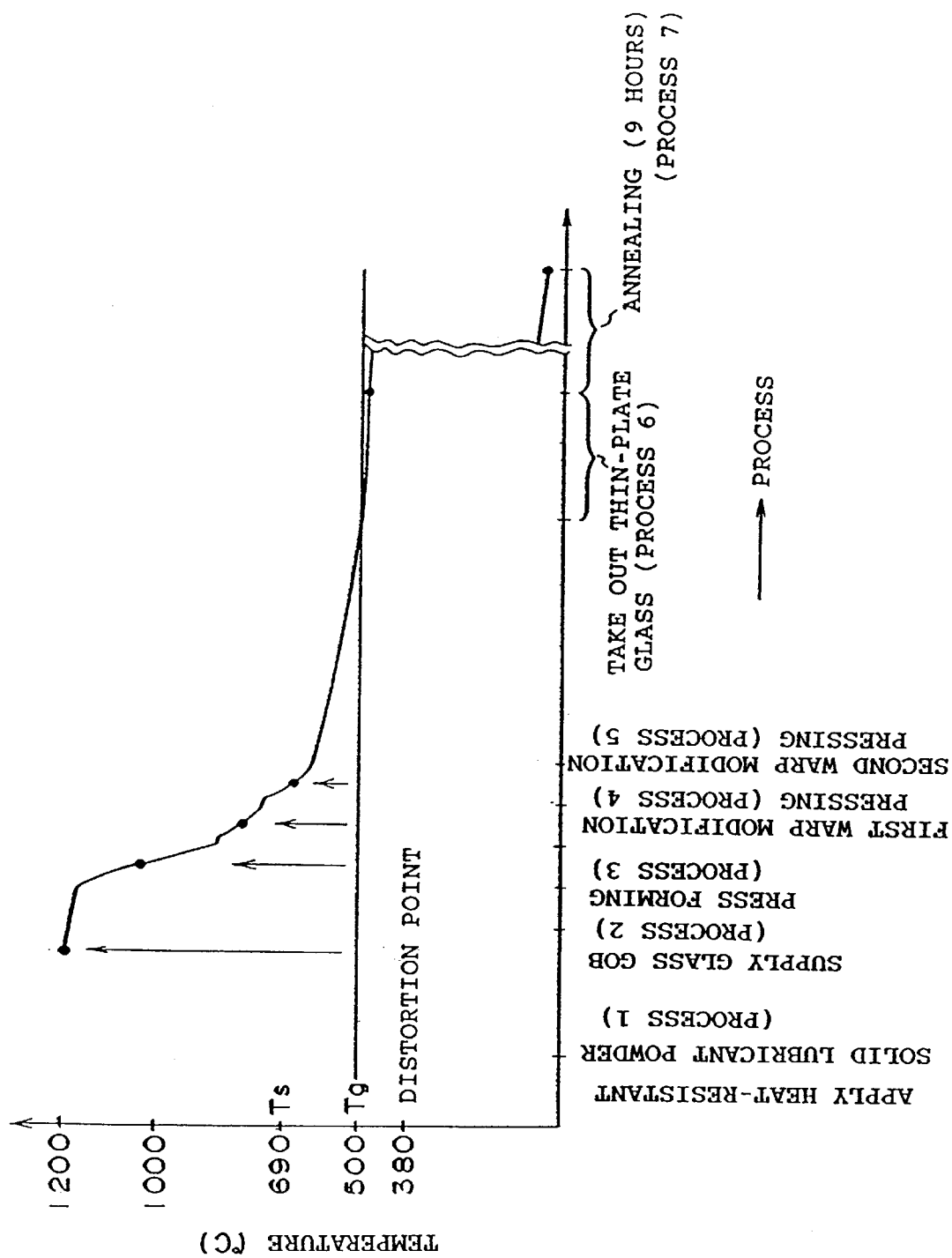
FIG. 1 diagrammatically shows a temperature change property of a material glass in a method of manufacturing a thin-plate glass according to an embodiment of the invention.
Figure 2:
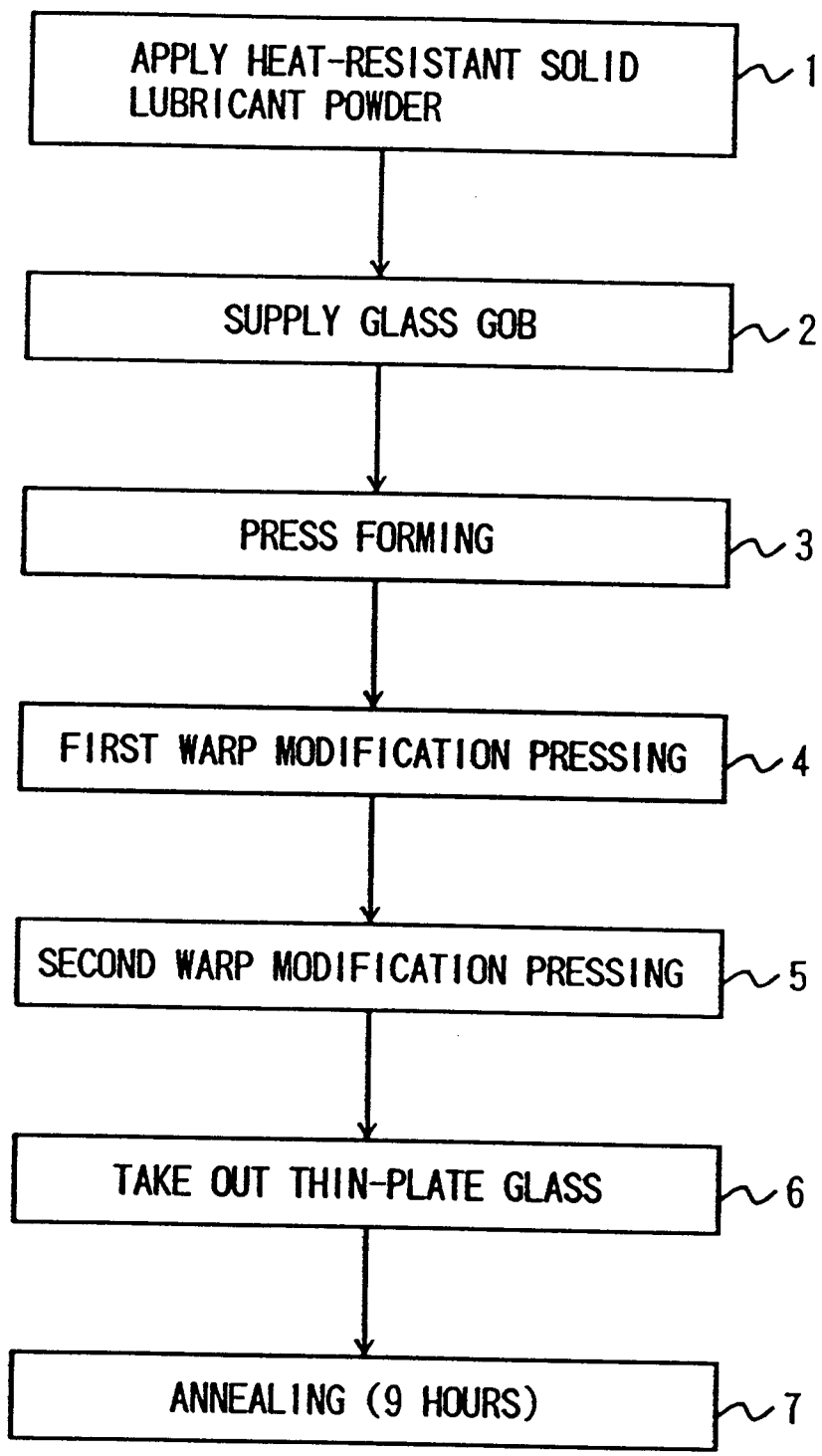
FIG. 2 is a process drawing of the method of manufacturing the thin-plate glass according to the embodiment of the invention.

Embodiments of a method for manufacturing a thin-plate glass according to the invention will be described with reference to the accompanying drawings. FIG. 1 diagrammatically shows a temperature change property of a material glass, and FIG. 2 shows processes of the manufacture method. The composition of the material glass whose temperature change property is shown in FIG. 1 is as follows: specifically, the material glass contains in percentages by weight 63.7% of $SiO_2$, 14% of $Al_2O_3$, 7% of $Li_2O$, 9% of $Na_2O$, 6% of $ZrO_2$ and 0.3% of $Sb_2O_3$. As shown in FIG. 2, in the manufacture method according to an embodiment of the invention, first at process 1, heat-resistant solid lubricant powder is applied to a lower-die forming face. The heat-resistant solid lubricant powder is constituted of hexagonal BN (boron nitride) powder. The powder is spouted together with gas to stick to the lower-die forming face. Since the heat-resistant solid lubricant powder sticks to the forming face, the die releasability, the molten glass elongation and the like can be enhanced. Subsequently, at process 2, an appropriate amount of molten glass (1200° C. as shown in FIG. 1) is supplied to the lower-die forming face to form marble-shaped glass gob which is rounded by means of surface tension. At the next process 3, an upper die is lowered onto a lower die, and the glass gob is pressed between the upper and lower dies to form a thin-plate glass. In this process, the press forming is performed in a short time of about one second. When the thin-plate glass is softened, that is, when the inside of the thin-plate glass is at a softening point (Ts) of 690° C. or a higher temperature as shown in FIG. 1, the upper die is raised to finish the press forming. Additionally, the heat-resistant solid lubricant powder (hexagonal BN powder) beforehand sticks to the forming face of the upper die for use in the press forming in the same manner as the lower die. Therefore, when detaching the upper die from the softened high-temperature plate glass, the glass can be prevented from adhering to the upper die.

Subsequently, warp ratio modifying process is applied to the thin-plate glass which is left on the lower die. Here, the warp modification pressing is performed by using a forming die which has a forming face in the same manner as the upper die. The warp modification pressing is performed twice. As shown in process 4 of FIG. 2, when the first warp modification pressing is performed, the thin-plate glass still has the temperature equal to or higher than the softening point of 690° C. Subsequently, at process 5 where the second warp modification pressing of the thin-plate glass is performed, as shown in FIG. 1, the thin-plate glass has an intermediate temperature between the softening point of 690° C. and a transition point (Tg) of 500° C. Thereafter, when the temperature is lowered to the transition point of 500° C. or lower (provided that the temperature equals or exceeds a distortion point of 380° C.), the thin-plate glass is taken out of the lower die (process 6). The process goes to process 7 of annealing (nine hours).

In the method, the press forming is finished when the thin-plate glass is softened and the forming die and the glass are in a thermally unbalanced condition. Therefore, the time for press forming can be shortened. Additionally, when the inside of the thin-plate glass has a temperature higher than the glass transition point, the warp modification pressing is finished. Also, the time interval between the completion of the press forming and that of the warp modification pressing is set short. Therefore, according to the method, the mass productivity of the thin-plate glass is enhanced. Further in the method, the pressing time is short. The quantity of heat which moves from the thin-plate glass to the upper and lower dies is not uniform. Upper-die and lower-die ends of the thin-plate glass are in a thermally unbalanced condition. Therefore, the thin-plate glass is warped to some degree, but the warp is modified by the warp modification pressing. Therefore, the thin-plate glass with a good flatness can be manufactured.

Figure 3:
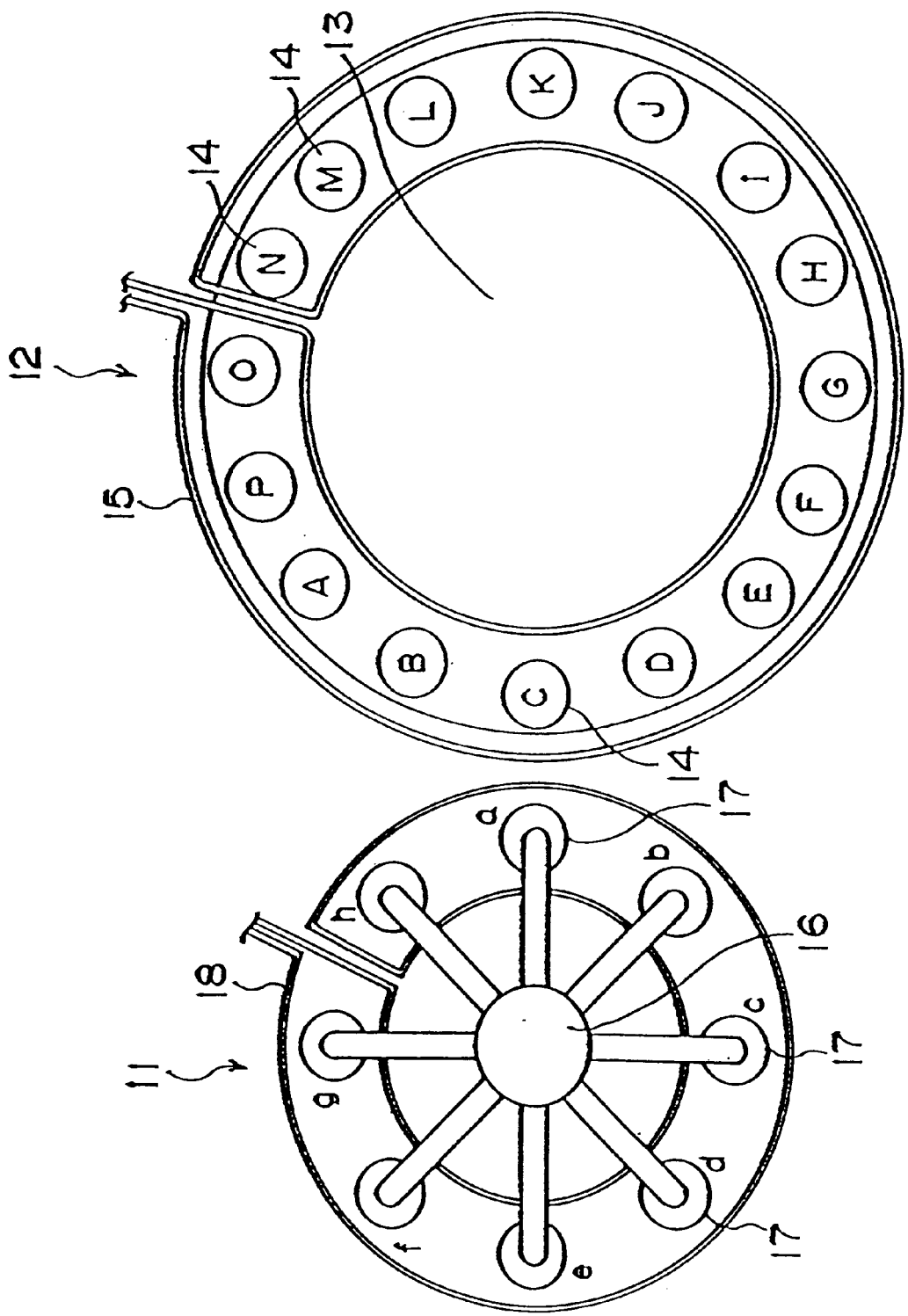
FIG. 3 is a plan view of an upper-die device and a lower-die device which are used in the method of FIG. 2.

FIG. 3 is a plan view showing an example of an upper-die device 11 and a lower-die device 12 which are used in the method described above. In the lower-die device 12, sixteen lower dies 14 are arranged at equal intervals on the circumference of a turntable 13 which is rotated about a rotation axis (not shown) of a central portion by one pitch once in two seconds. The lower dies 14 move successively from position A to P as shown in FIG. 3 every time the turntable 13 is rotated by one pitch. For the lower die 14, in the position O, as shown in the process 1 of FIGS. 1 and 2, the heat-resistant solid lubricant powder is applied to the forming face. In the position A, as shown in the process 2 of FIGS. 1 and 2, the glass gob is supplied. In the position C, as shown in the process 3 of FIGS. 1 and 2, the press forming is performed. In the position D, as shown in the process 4 of FIGS. 1 and 2, the first warp modification pressing is performed. In the position E, as shown in the process 5 of FIGS. 1 and 2, the second warp modification pressing is performed. In the positions L to N, as shown in the process 6 of FIGS. 1 and 2, the thin-plate glass is taken out. Additionally, inner and outer peripheries of the sixteen lower dies 14 are surrounded by a high-frequency coil 15. Specifically, in the device, the sixteen lower dies 14 are collectively high-frequency induction heated by one common high-frequency coil 15. Further, the high-frequency coil 15 heats the lower dies to the same temperature. For this purpose, the outer and inner peripheries of the lower dies disposed on the circumference are surrounded by the high-frequency coil 15 in such a manner that distances between the lower dies and the coil become constant. Therefore, the sixteen lower dies 14 can be uniformly heated. Further, by rotating the sixteen lower dies 14, the relationship between the lower dies 14 and the high-frequency coil 15 is uniformed. The sixteen lower dies 14 can be heated further uniformly. Thus, when the forming die is heated through the high-frequency induction heating, no partial temperature difference arises in one forming die. The partial elongation defect of the glass can be avoided. Also, the glass can be prevented from fusing and adhering to the forming die. Additionally, temperatures of all the dies can be controlled to desired temperatures. The thin-plate glass of equal quality can be mass-produced.

In the upper-die device 11, upper dies 17 are attached to tip ends of eight legs of a rotary unit 16. In the same manner as the turntable 13, the rotary unit 16 is rotated by one pitch, i.e., once in two seconds, while the eight upper dies 17 are rotated integrally with the rotary unit 16 from positions a to h. The upper dies 17 are also high-frequency induction heated. In this case, inner and outer peripheries of the eight upper dies 17 are surrounded by a high-frequency coil 18. Preferably, the eight upper dies 17 are collectively high-frequency induction heated by the high-frequency coil 18. The heat-resistant lubricant powder is applied to the forming face of the upper die 17 in any position other than the position where the upper die 17 is used for pressing, e.g., in the position e. Also, in the position a opposite to the position e, the upper die 17 is positioned on the lower die 14 in the position C (the upper die is shown on the left side for convenience of drawing in FIG. 3) and used for press forming. Therefore, in the device, when the upper die 17 is rotated to arrive at the position a, i.e., once in eight press forming works, the upper die 17 is used for the press forming. Since the same upper die is used for the press forming after a time interval, it is prevented from being overheated. Specifically, when the upper die 17 is used for the press forming, it receives heat from the glass gob, thereby increasing its temperature. If this is continuously repeated, the upper die will be overheated to disadvantageously cause the glass to adhere to the forming face. However, in the device, the same upper die is used after a certain time interval, i.e., once in eight press forming works. The upper die 17 fails to be overheated, and is kept at the predetermined temperature which is adjusted in the high-frequency induction heating. The glass can be prevented from adhering to the die.

Figure 4:
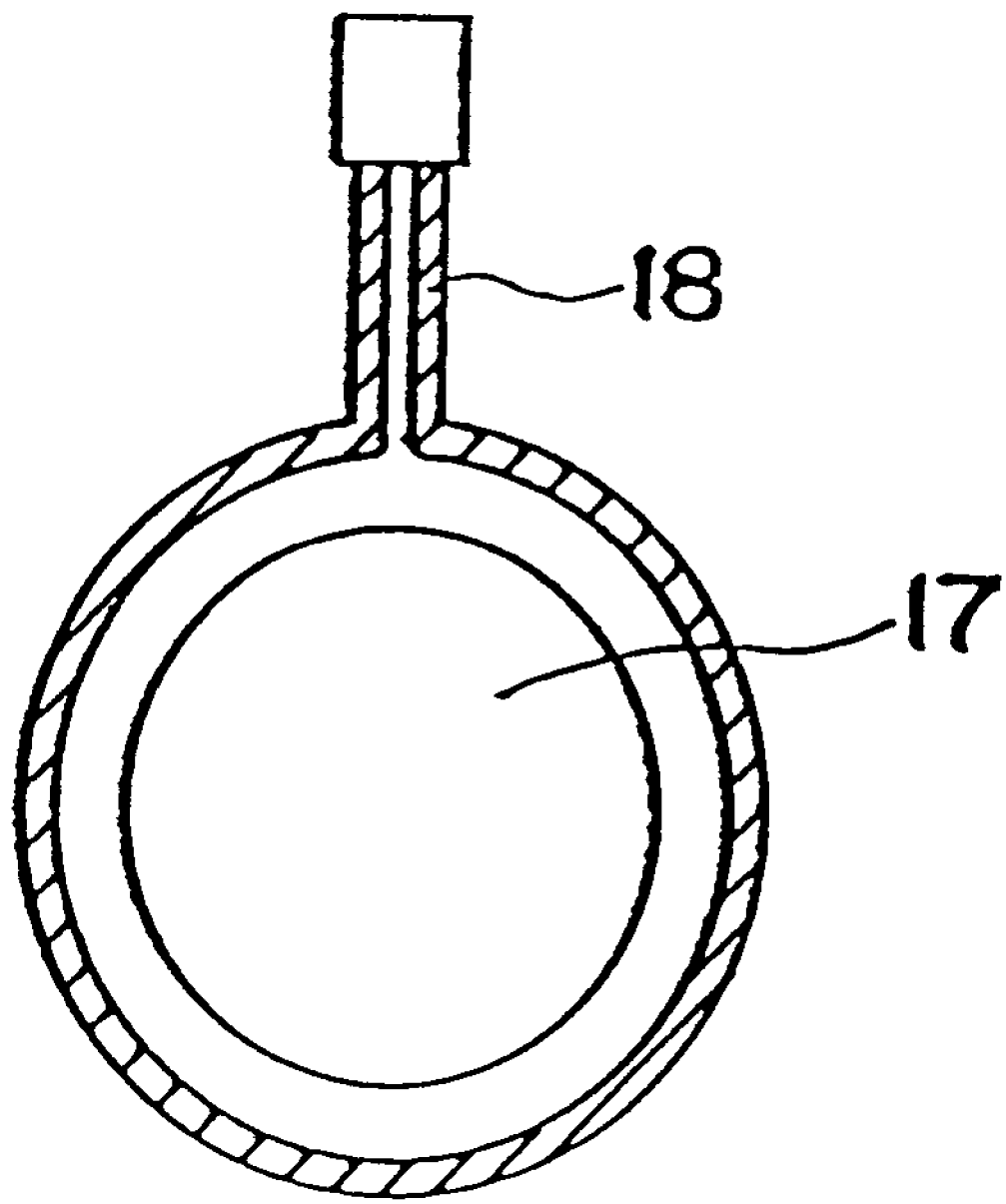
FIG. 4 is a plan view showing another example of relationship between an upper die and a high-frequency coil.

Additionally, the high-frequency coil 18 of the upper-die device 11 and the high-frequency coil 15 of the lower-die device 12 are preferably both water-cooled, so that the temperatures of the high-frequency coils are prevented from rising because of the heat radiated from the forming dies. Also, for example, when a single upper die is used as shown in FIG. 4, by disposing the coil 18 at a constant distance from the upper die 17, the upper die 17 can be uniformly heated. Further, when the single upper die is used as shown in FIG. 4, the Nichrome heater may be, instead of the coil 18, disposed around the upper die.

The upper die 17 and the lower die 14 can be of various structures, but a concrete example is shown in FIG. 5. The upper die 17 is constituted of a cylindrical upper-die body 21 and a support rod 22 formed on the upper central portion of the upper-die body 21 for supporting the upper-die body 21. The flat lower face of the upper-die body 21 forms a pressing face (forming face) 23. Further, when the support rod 22 is vertically moved by a drive (not shown), the upper die 17 is moved vertically. Also, in the central portions of the upper-die body 21 and the support rod 22, a hollow portion 24 is formed open in the top face of the support rod 22. Further, in the upper-die portion around the hollow portion 24, eight discharge ports 25 are formed as shown in the plan view of FIG. 6 to connect to the hollow portion 24 in the depth of the hollow portion 24 and open in the top face of the support rod 22. Here, by spraying water together with air upon the hollow portion 24, the upper die 17 can be cooled by using vaporization heat of water. Vaporized water is discharged from the discharge ports 25. The vaporization heat of water per unit volume is larger than specific heat. Therefore, in the cooling method using the vaporization heat, without using a larger equipment, a higher cooling efficiency can be achieved as compared with the method of circulating water as cooling medium, moreover, when water is used as the cooling medium, by circulating water so as to fill the hollow portion 24 with water, the forming face can be cooled with less cooling dispersions.

The upper die 17 is provided with a cylindrical die 26 for surrounding the upper die 17. The cylindrical die 26 is constituted of a cylindrical die body 27 and an annular flange portion 28 protruded inwardly on the upper end of the cylindrical die body 27. The lower inner peripheral face of the cylindrical die body 27 has a larger diameter than the other portions, and further forms a slant face 29 which is enlarged downward for chamfering the press-formed thin-plate glass. The upper die 17 is mounted vertically slidably along the inner peripheral face of the cylindrical die 26.

The lower die 14 is constituted of a cylindrical lower-die body 31 and a support rod 32 formed on the lower central portion of the lower-die body 31 for supporting the lower-die body 31. The flat upper face of the lower-die body 31 forms a pressing face (forming face) 33. Further, when the support rod 32 is vertically moved by a drive (not shown), the lower die 14 is moved vertically. Also, in the central portions of the lower-die body 31 and the support rod 32, a hollow portion 34 is formed open in the lower face of the support rod 32. Further, in the lower-die portion around the hollow portion 34, eight discharge ports 35 are formed as shown in the lower-face view of FIG. 6 to connect to the hollow portion 34 in the depth of the hollow portion 34 and open in the lower face of the support rod 32. Here, by spraying water together with air upon the hollow portion 34, the lower die 14 is cooled by using the vaporization heat of sprayed water. Vaporized water is discharged from the discharge ports 35.

The cooling described above is PID controlled in response to a signal from a thermocouple installed on the forming die. The forming die is controlled to have the predetermined temperature. Even when the forming is continuously performed, molten glass can be formed in the forming die which is kept at the constant temperature.

The lower die 14 is provided with a cylindrical die 36 for surrounding the lower die 14. The cylindrical die 36 is constituted of a cylindrical die body 37 and an annular flange portion 38 protruded inwardly on the lower end of the cylindrical die body 37. The upper inner peripheral face of the cylindrical die body 37 has a larger diameter than the other portions. The inner peripheral face of the large-diameter portion further forms a slant face 39 which is enlarged upward for chamfering the press-formed thin-plate glass. The lower die 14 is mounted vertically slidably along the inner peripheral face of the cylindrical die 36.

Additionally, the pressing face 33 of the lower die 14 and the pressing face 23 of the upper die 17 are formed into rough faces with a surface roughness (Ra) of, e.g., 0.5 to 2.0 $\mu$m. The rough faces may be formed in whole or only in part on the pressing faces 33 and 23. By forming the rough faces on the pressing faces 33 and 23, insulation can be enhanced, the glass can be prevented from adhering to the die, and the heat-resistant solid lubricant powder can be securely stuck. Also, in the constitution described above, the slant faces 29 and 39 for forming chamfered portions are formed on the inner peripheral face of the cylindrical dies 26 and 36. The method of forming the slant faces can provide an enhanced durability as compared with the method of forming protrusions on the forming die to form the slat faces.

Figure 10:
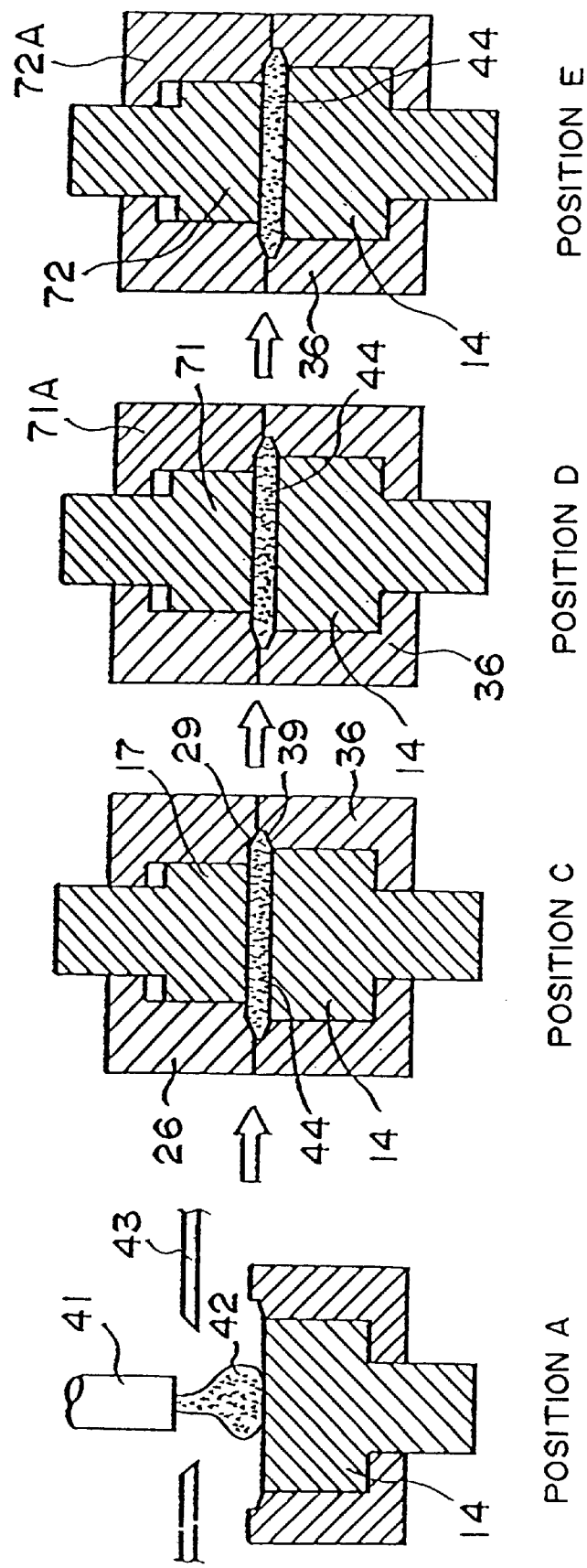
FIG. 10 shows explanatory sectional views of press forming and warp modification pressing.

Besides the aforementioned upper and lower dies 17 and 14, in the positions D and E of FIG. 3, in order to perform the warp modification pressing, as shown in FIG. 10 (the hollow portions 24, 34 and the discharge ports 25, 35 are omitted from FIG. 10), upper dies (forming dies) 71 and 72 for the warp modification pressing are opposed to the lower die 14. The warp modification pressing upper dies 71 and 72 are provided with cylindrical dies 71A and 72A, and, here, constituted in the same manner as the aforementioned press forming upper die 17, in consideration of differences of conditions during the press forming and during the warp modification pressing, for example, the differences of the temperature of the forming die, the temperature distribution of the forming face, the configuration of the formed glass, the temperature of the formed glass, and the like, the configuration of the forming face is preferably varied so as to obtain the desired thin-plate glass.

For example, the curvatures of the forming face of the upper die for the press forming and the forming faces of the flat boards for the warp modification pressing can be changed.

In this case, temperatures are adjusted as follows: while the press forming upper die 17 has a temperature of 410° C. on its forming face, the first warp modification pressing upper die 71 has a temperature of 600° C. on its forming face and the second warp modification pressing upper die 72 has a temperature of 560° C. on its forming face.

The method of press forming a disc-like thin-plate glass in the above-constituted forming device will be described with reference to FIGS. 3 and 7 to 10. For the sake of simplicity, in the same manner as FIG. 10, in FIGS. 7 to 9 the hollow portions 24, 34 and the discharge ports 25, 35 are omitted.

Figure 7A:
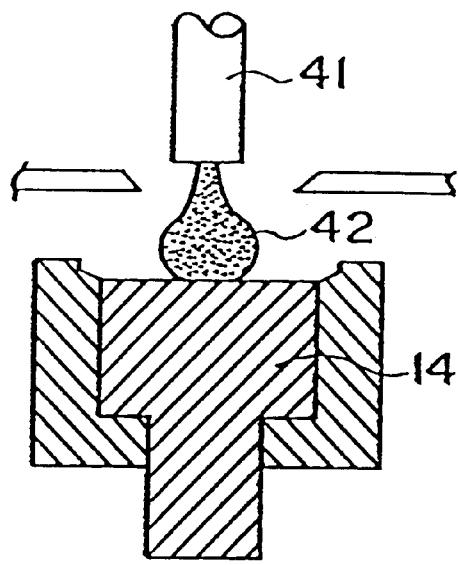
FIGS. 7A and 7B are explanatory sectional views of press forming.
Figure 7B:
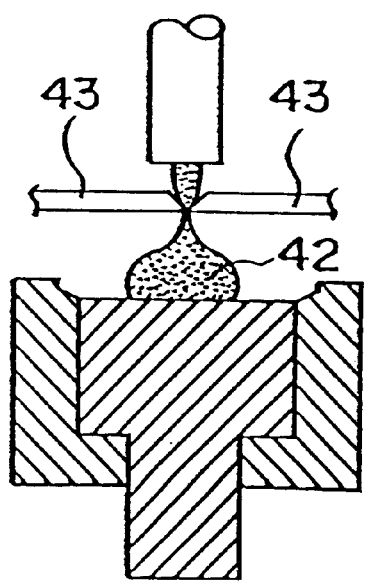
Figure 8A:
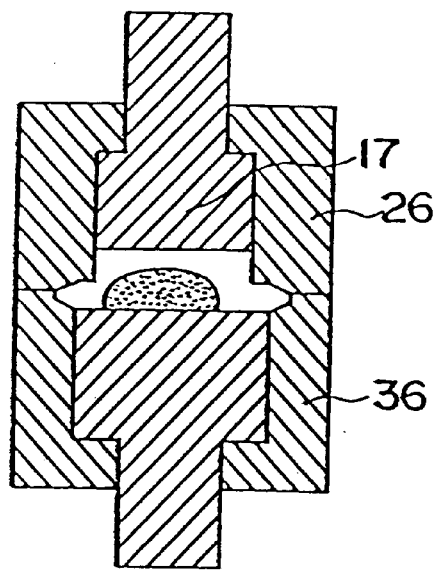
FIGS. 8A and 8B are explanatory sectional views of the press forming.
Figure 8B:
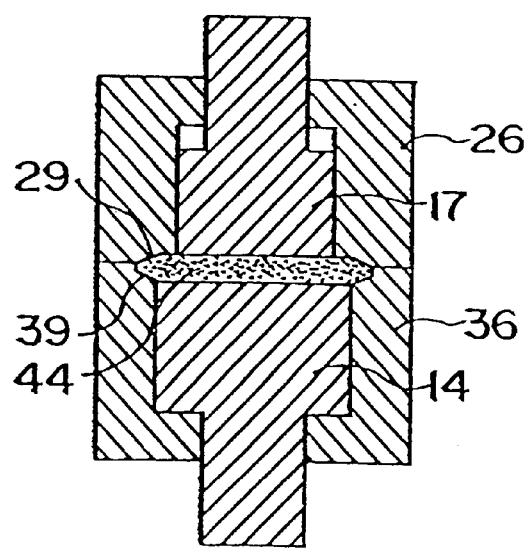

When the lower die 14 is rotated to arrive at the position A in FIG. 3, as shown in FIG. 7A and in the position A of FIG. 10, molten glass 42 heated to 1200° C. is supplied at a constant flow rate from a platinum pipe 41 onto the lower die 14 (whose forming face has a temperature of 450° C.). When reaching the predetermined amount, the molten glass 42 is, as shown in FIG. 7B, cut with cutting edges 43. The cut molten glass 42 forms a marble-like glass gob rounded by a surface tension. Subsequently, when the lower die 14 is rotated to reach the position C of FIG. 3, as shown in FIG. 8A, the upper die 17 (whose forming face has a temperature of 410° C.) is lowered integrally with the cylindrical die 26, until the lower face of the cylindrical die 26 abuts on the top face of the lower-die cylindrical die 36. Subsequently, as shown in FIG. 8B and the position C of FIG. 10, the upper die 17 slides downward along the inner peripheral face of the cylindrical die 26. The glass gob is press-formed between the upper die 17 and the lower die 14. Then, the glass gob spreads over a flat space surrounded by the cylindrical dies 26 and 36 to form a thin-plate glass 44. At this time, on both outer peripheral surfaces of the thin-plate glass 44, chamfered portions for preventing cracks are formed by the slant faces 29 and 39 on the inner peripheral faces of the cylindrical dies 26 and 36. The time necessary for the forming is about 1.7 seconds.

Figure 9A:
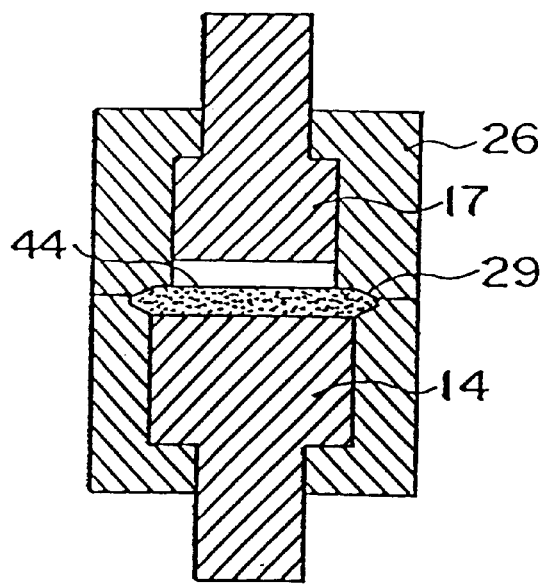
FIGS. 9A and 9B are explanatory sectional views of the press forming.
Figure 9B:
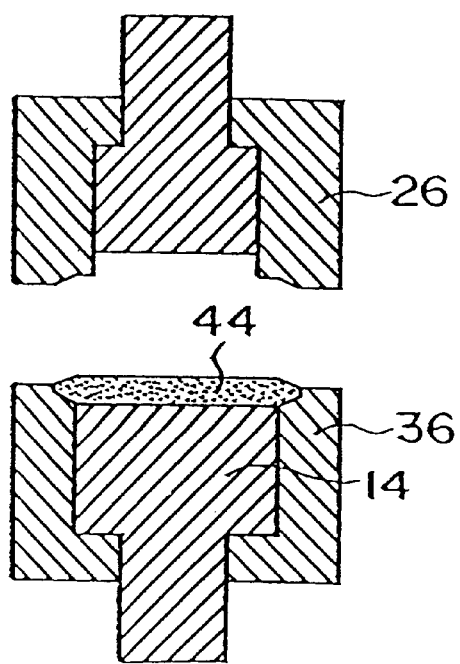

Subsequently, as shown in FIG. 9A, the upper die 17 slides upward along the inner peripheral face of the cylindrical die 26. At this time, the thin-plate glass 44 may adhere to and rise with the upper die 17. In the device, however, the thin-plate glass 44 is pressed by the inner face of the large-diameter inner peripheral portion of the upper-die cylindrical die 26 (the inner face of the portion having the slant face 29). Therefore, the thin-plate glass 44 is prevented from rising together with the upper die 17, and held on the lower die 14. Thereafter, as shown in FIG. 9B, the upper-die cylindrical die 26 goes upward. At this time, since the thin-plate glass 44 has only a small abutment area on the upper-die cylindrical die 26, the glass 44 is prevented from adhering to and rising with the upper-die cylindrical die 26.

Figure 16:
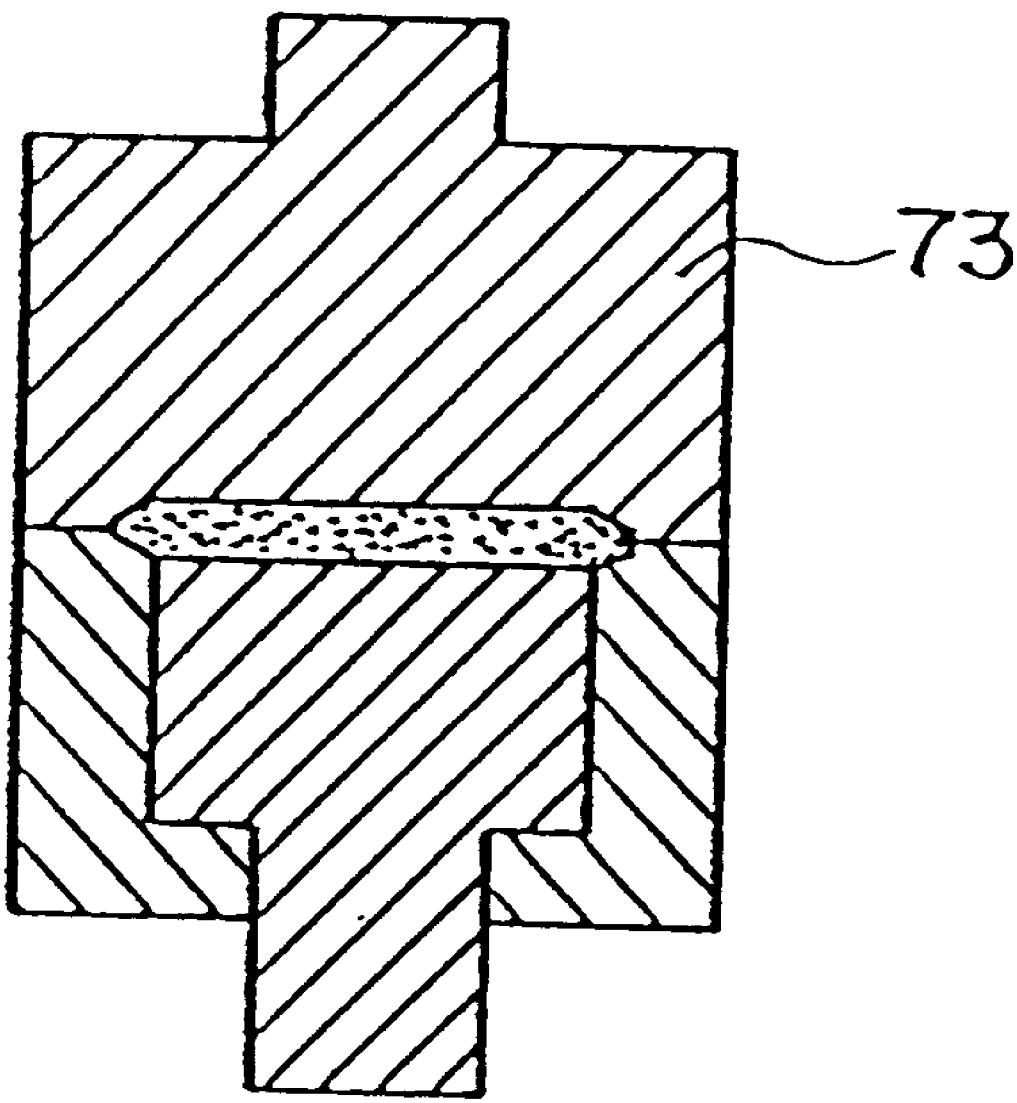
FIG. 16 is a sectional view showing another example of the upper die for the warp modification pressing.

Subsequently, when the lower die 14 is rotated to reach the position D of FIG. 3, as shown in the position D of FIG. 10, the first warp modification pressing upper die 71 and the cylindrical die 71A move down onto the lower die 14 and the cylindrical die 36. Then, the first warp modification pressing is performed on the thin-plate glass 44 held on the lower die 14. Further, when the lower die 14 is rotated to reach the position E of FIG. 3, as shown in the position E of FIG. 10, the second warp modification pressing upper die 72 and the cylindrical die 72A move down onto the lower die 14 and the cylindrical die 36. Then, the second warp modification pressing is performed on the thin-plate glass 44 held on the lower die 14. The time necessary for the first warp modification pressing is about 1.7 seconds. Thereafter, while the lower die 14 is rotated toward the positions L to N of FIG. 3, the lower die 14 slides upward along the inner peripheral face of the cylindrical die 36. Then, the thin-plate glass 44 is taken out. Subsequently, the lower die 14 is rotated toward the positions O, P, A . . . of FIG. 3 to be again used for the press forming. Additionally, the upper die for use in the warp modifying may be an upper die 73 shown in FIG. 16 which is constituted by integrally forming the upper die 71 (or 72) and the cylindrical die 71A (or 72A) shown in FIG. 10.

Figure 11:
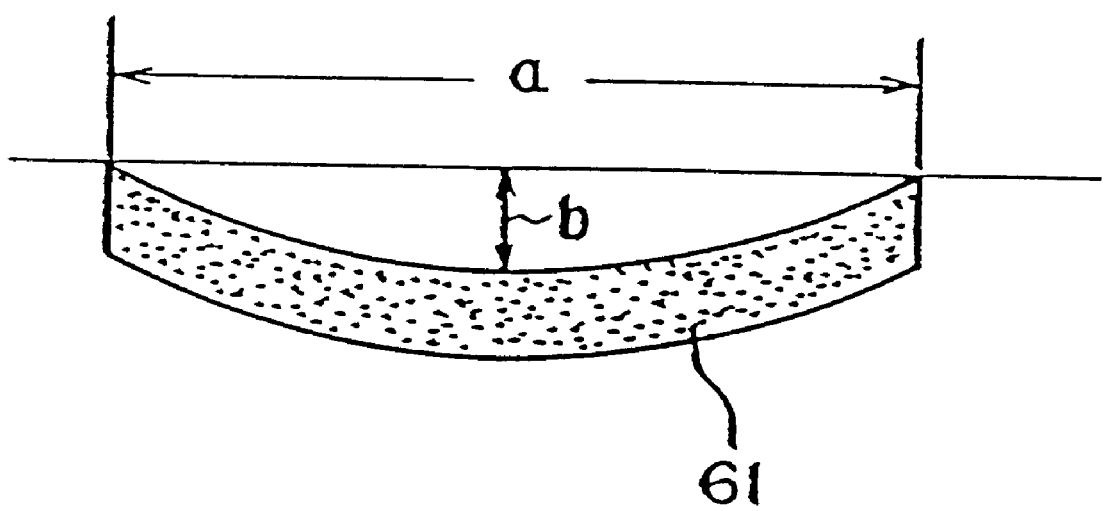
FIG. 11 is a sectional view of a disc-like glass which is manufactured according to the embodiment of the invention.

In the aforementioned method, a disc-like glass 61 with a diameter of 66 mm and a thickness of 1.3 mm shown in FIG. 11 was actually manufactured. Further, the warp ratio of the manufactured disc-like thin-plate glass was measured. As the size of the warp ratio used was the value of proportion (b/a) of a warp quantity b relative to a reference length a (diameter of the disc-like glass 61) shown in FIG. 11. As clearly seen from Table 1, after the glass is subjected to every warp modification pressing process, the warp quantity b of the disc-like glass is reduced.

another warp is directed downward, the lapping/polishing cannot be stabilized, and the glass cannot be ground/polished flat with high-precision. Defective products will increase in number. The warp direction was constant in the example probably because in the manufacture process the heat of the molten glass was constantly taken away.

Machining will be described in detail. Specifically, during the machining, the surface of the glass is washed with water, then the glass is subjected to the following processes: (1) rough machining (coarse polishing); (2) sanding (precise grinding, lapping); (3) first polishing; and (4) second polishing (final polishing).

(1) Rough Machining Process

First, each of both faces of the glass substrate was ground with a diamond grindstone with a fine grain size. At this time, the load was about 100 kg. Thereby, both the faces of the glass substrate were finished to have a surface roughness Rmax (measured according to Japanese Industrial Standard B 0601) of about 10 $\mu$m.

Subsequently, a hole was made in the central portion of the glass substrate by using a cylindrical grindstone, and the outer peripheral end face of the substrate was ground to have a diameter of 65 mm. After that, the outer peripheral end face and the inner peripheral face were chamfered in the predetermined manner.

(2) Sanding (Lapping) Process

Subsequently, the glass substrate was sanded. The sanding process was performed to enhance precision in dimension and configuration. The sanding process was performed twice by using a lapping device and changing an abrasive grain size to #400 and #1000.

Specifically, first an alumina abrasive grain with the grain size of #400 was used. By rotating inner and outer rotary gears, both the faces of the glass substrate housed in a carrier were lapped with a precision of 0 to 1 $\mu$m and a surface roughness (Rmax) of about 6 $\mu$m. During the lapping the load was gradually increased from 80 kg to 120 kg.

Subsequently, the grain size of the alumina abrasive grain was changed to #1000, and the lapping was performed to provide a surface roughness (Rmax) of about 2 $\mu$m.

The sanded glass substrate was dipped successively in respective washing tanks of neutral detergent and water. Thus, washing was performed.

(3) First Polishing Process

Subsequently, the first polishing process was performed by using a polishing device to remove scratch and distortion which remain after the aforementioned sanding process.

Specifically, as a polisher (polishing powder), a hard polisher (Cerium Pad MHC1 manufactured by Speed Fam

TABLE 1

|  | AFTER PRESS FORMING PROCESS | AFTER FIRST WARP MODIFICATION PRESSING PROCESS | AFTER SECOND WARP MODIFICATION PRESSING PROCESS |
| --- | --- | --- | --- |
| REFERENCE LENGTH a | 66.0 mm | 66.0 mm | 66.0 mm |
| WARP QUANTITY b | 0.10–0.25 mm | 0.08–0.15 mm | 0.01–0.06 mm |
| WARP RATIO (b/a) | 0.15–0.37% | 0.12–0.23% | 0.015–0.03% |

The press-formed thin-plate glass is formed thicker than the final product. Therefore, its both main surfaces are ground by lapping, polishing and the like. Then, the warp size of the thin-plate glass in the example was able to be made constant to some degree. Also, the warp was all directed upward constantly. Therefore, in the subsequent lapping/polishing process, the thin-plate glass was aligned in the warp direction so that it was able to be ground flat with a high precision. If some warp is directed upward while Co.) was used, and the first polishing process was performed under the following polishing conditions:

Polishing liquid: cerium oxide+water

Load: 300 g/cm$^2$ (L=238 kg)

Polishing time: 15 minutes

Removal quantity: 30 $\mu$m

Lower fixed board rotation frequency: 40 rpm

Upper fixed board rotation frequency: 35 rpm

Inner gear rotation frequency: 14 rpm
Outer gear rotation frequency: 29 rpm

After the first polishing process, the glass substrate was dipped successively in respective washing tanks of neutral detergent, pure water, pure water, IPA (isopropylene alcohol) and IPA (steam drying), thereby performing washing.

(4) Second Polishing Process

Subsequently, the second polishing process was performed by using the same polishing device as in the first polishing process and replacing the hard polisher with a soft polisher (Polylax manufactured by Speed Fam Co.). The polishing conditions were the same as those of the first polishing process except that the load was 100 g/cm$^2$, the polishing time was five minutes and the removal quantity was 5 μm.

After the second polishing process, the glass substrate was dipped successively in respective washing tanks of neutral detergent, neutral detergent, pure water, pure water, IPA (isopropylene alcohol) and IPA (steam drying), thereby performing washing. Additionally, ultrasonic wave was applied to each of the washing tanks.

In this method, a disc-like glass substrate for use in an information recording medium was obtained, which had an outer diameter of 65 mm, a diameter of the hole in the central portion of 20 mm, a thickness of 0.5 mm, Rmax of 40 angstrom and Ra of 8 angstrom.

In the manufacture method of the aforementioned embodiment according to the invention, plural lower dies 14 are arranged on the turntable 13. Each of the lower dies is successively conveyed to the position where the pressing is performed. After the pressing and other processes, the formed thin-plate glass is taken out of each of the lower dies. Each of the lower dies 14 is again used for manufacturing the thin-plate glass. Thus, the thin-plate glass can be mass-produced.

Further, in the aforementioned embodiment, the warp modification pressing is performed in the positions D and E. When a high flatness is unnecessary, the warp modification pressing may be performed in either one of the positions D and E. However, if the warp modification pressing is performed in the position F and subsequent positions in which the thin-plate glass 44 is excessively hard, the thin-plate glass tends to be cracked or broken.

Further, in the aforementioned embodiment, the warp modification pressing upper die is constituted in the same manner as the press forming upper die. Alternatively, an upper die as shown in FIGS. 12 to 14 may be used.

Figure 12:
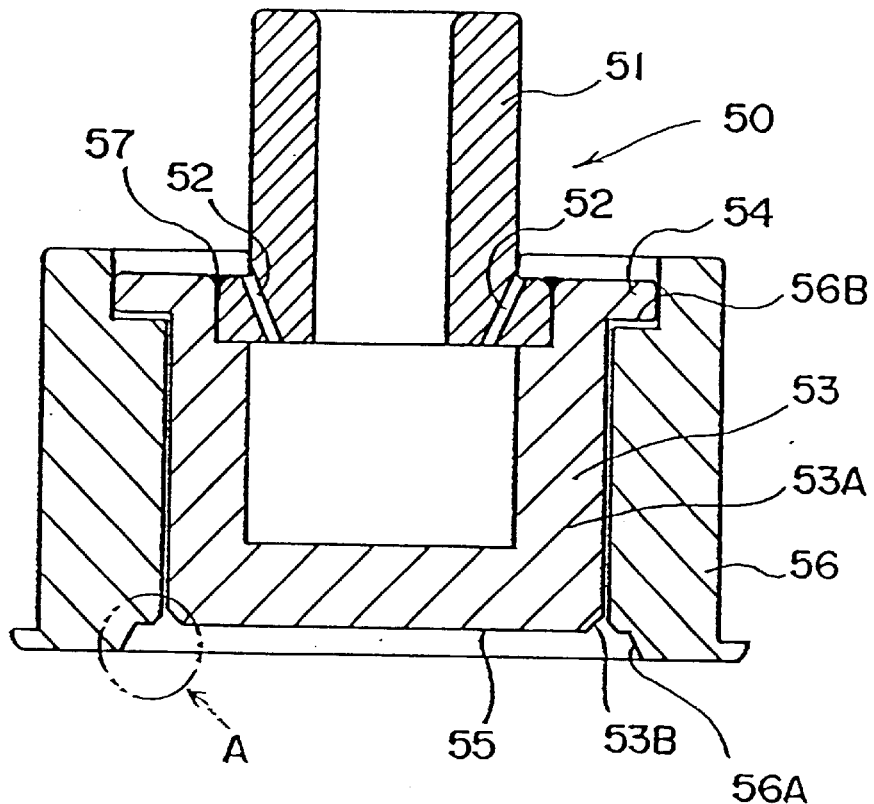
FIG. 12 is a sectional view showing another upper die for the warp modification pressing.

As shown in FIG. 12, an upper die 50 is constituted of a small-diameter cylindrical member 51 with a groove 52 serving as a cooling air path formed therein and a bottomed large-diameter cylindrical member 53 having a flange 54 on its open end. These members are welded via a welding portion 57. The upper die 50 is mounted in a cylindrical die 56. The upper die 50 is reciprocated along an axial line of the cylindrical die 56 by an air cylinder (not shown). The downward movement of the upper die 50 is restricted because the flange 54 abuts on a stepped face 56B formed on an upper inner end of the cylindrical die 56.

Figure 13:
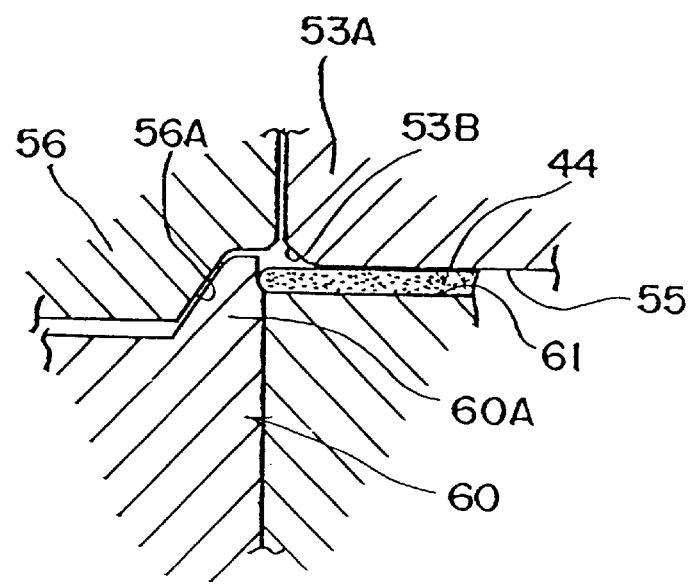
FIG. 13 is an enlarged sectional view of a portion A of FIG. 12.

A cylindrical portion 53A of the large-diameter cylindrical member 53 in the upper die 50 has an outer diameter which is smaller than the diameter of a pressing face 61 of a lower die 60 shown in FIG. 13 (enlarged view of a circled portion A of FIG. 12). Further, the lower end of the cylindrical portion 53A has a chamfered portion 53B along its entire periphery. Therefore, during the warp modification pressing, the thin-plate glass 44 is cooled at a high speed. The pressing face 55 of the upper die 50 does not abut on the peripheral portion of the thin-plate glass which is hardened most. The thin-plate glass 44 is thus prevented from being cracked or broken.

Figure 14:
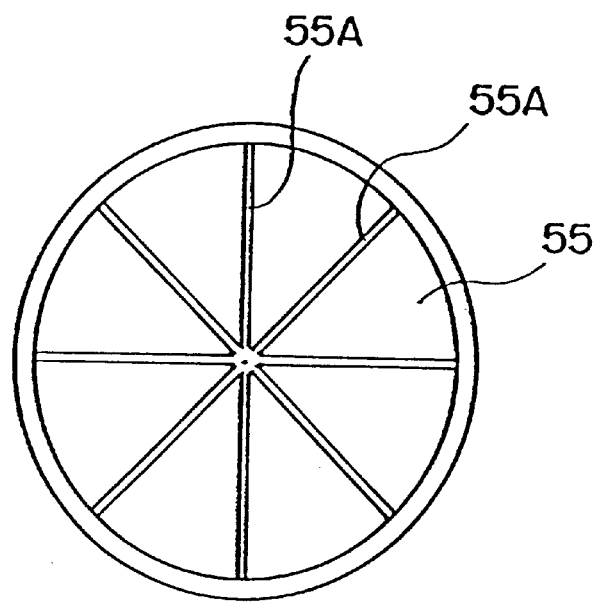
FIG. 14 is a lower face view showing a pressing face of the upper die for the warp modification pressing of FIG. 12.

As shown in FIG. 14, plural v-shaped grooves 55A are radially formed in the pressing face 55 of the upper die 50. Each of the grooves 55A helps the thin-plate glass 44 to be easily released from the pressing face 55 of the upper die 50 after the warp modification pressing. Additionally, since the warp modification pressing is performed as aforementioned when the thin-plate glass 44 is so hard that it is not deformed, the grooves 55A have no influence on the configuration of the thin-plate glass 44.

The lower inner end face of the cylindrical die 56 has a groove 56A formed along its entire periphery for centering with the lower die 60 as shown in FIG. 13. When the groove 56A is engaged with a protrusion 60A of the lower die 60, axial centers of the upper and lower dies 50 and 60 are aligned with each other.

Figure 15:
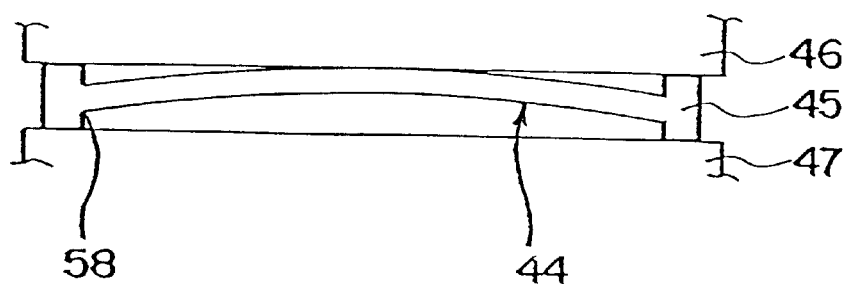
FIG. 15 is a sectional view showing another example of the thin-plate glass and a grinding process according to the invention.

The upper die 50 fulfills its effect especially when the warp modification pressing is performed on the thin-plate glass 44 which has a support portion 45 on its outer peripheral portion as shown in FIG. 15 and described later. Specifically, the support portion 45 has a region protruded toward the upper die. If the pressing face 55 of the upper die 50 abuts on the protruded region, a boundary portion 58 between the protruded portion of the pressing face 55 and the protruded region of the thin-plate glass 44 will be easily cracked or broken. However, by forming the chamfered portion 53B on the upper die 50, the pressing face 55 of the upper die 50 is prevented from abutting on the support portion 45.

Figure 17B:
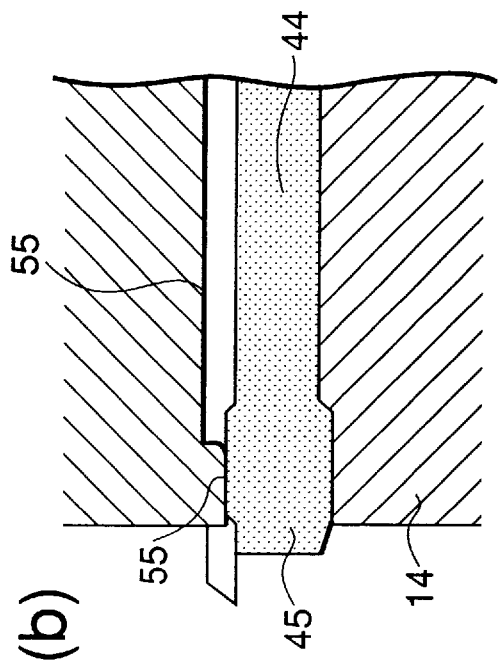
FIGS. 17(a)–(d) are sectional views showing further example of the upper die for the warp modification pressing.
Figure 17D:
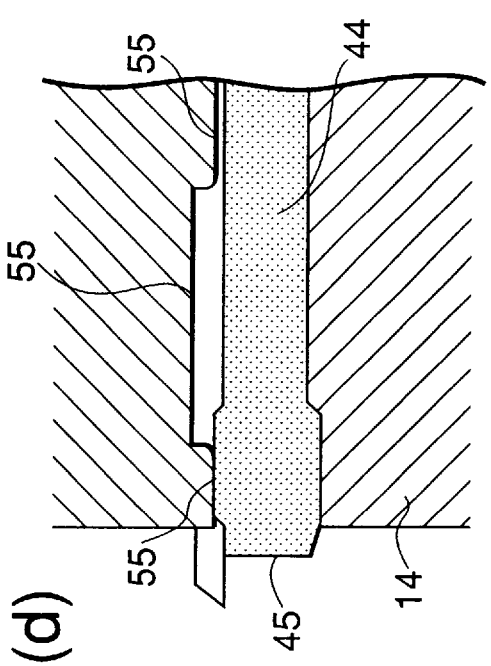
Figure 17A:
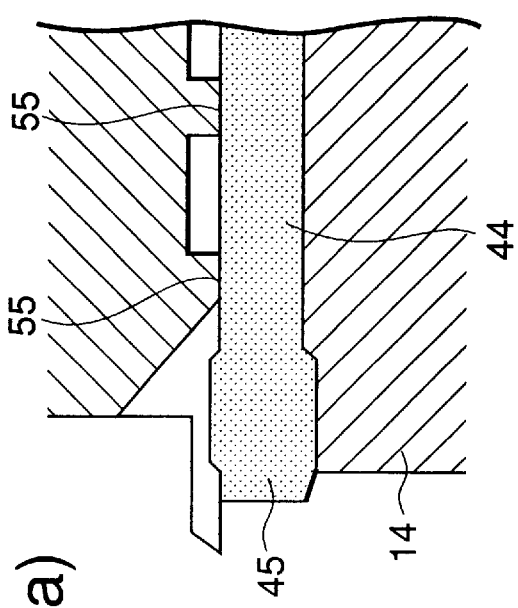

As the warp modification pressing die, in addition to a die like the upper die 50 for pressing substantially the entire surface of a central portion surrounded by the support portion 45 (hereinafter referred to as the central portion), a die for the warp modification pressing of only a selected part of the central portion as shown in FIG. 17(a) may be used, or a die for pressing only the support portion 45 as shown in FIG. 17(b) may be used. For the warp modification, both the dies in FIGS. 17(a) and 17(b) may be used.

Figure 17C:
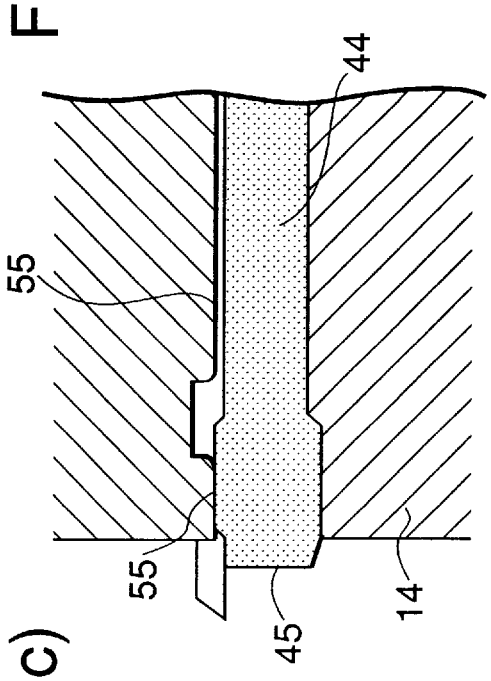

Moreover, as shown in FIGS. 17(c) and 17(d), in the die for pressing the support portion 45, by providing the central portion with a pressing face having a slight gap, when the central portion rises up during the pressing of the support portion 45, the rising can be modified, so that the flatness can be enhanced.

The die can be constructed so as to press both the support portion 45 and the central portion.

Since the press-formed thin-plate glass is formed thicker than the final product, both the main surfaces need to be ground by lapping, grinding and the like to form the final product. In this case, if the thin-plate glass is warped, it will be deflected by the pressure which is applied to both the surfaces of the thin-plate glass by the grinding plate. Therefore, even if the warped thin-plate glass is ground flat, the glass will be warped again after the pressure is released from both the surfaces thereof. A flat thin-plate glass is difficult to be obtained. To solve the problem, on a portion of the thin-plate glass, a region may be formed for receiving the pressure which is applied to both the surfaces of the thin-plate glass. As a concrete example, as shown in FIG. 15, the support portion 45 for bearing the pressure (with a height of 1.5 mm) is formed in the peripheral direction over the outer peripheral end portion of the thin-plate glass 44 whose curved portion has a thickness of 1.3 mm. The support portion 45 is preferably protruded from both the surfaces of the thin-plate glass 44. If the surface of the thin-plate glass 44 is protruded from the support portion 45, during the grinding the curved portion of the thin-plate glass 44 abuts on an upper fixed board 46 before the support portion 45 abuts on the upper fixed board 46. Then, the curved portion changes its condition. After the grinding, the thin-plate glass 44 is warped.

As shown in FIG. 15, the thin-plate glass 44 is interposed between the upper fixed board 46 and a lower fixed board 47. While applying a pressure from the fixed boards 46 and 47 to both the surfaces of the thin-plate glass, the thin-plate glass 44 is ground. The thin-plate glass 44 is formed flat to also have a predetermined thickness. In the grinding, the pressure applied from both sides by the upper and lower fixed boards 46 and 47 is received by the support potion 45. Therefore, the thin-plate glass 44 is prevented from being deflected. The thin-plate glass 44 is ground while its curved condition is prevented from changing. Therefore, even when the pressure applied from both sides by the upper and lower fixed boards 46 and 47 is released, the thin-plate glass 44 fails to be warped. The thin-plate glass 44 with a remarkably good flatness can be easily obtained. Also, the curved portion of the thin-plate glass 44 is prevented from moving, because the support portion 45 receives the pressure applied from both sides by the upper and lower fixed boards 46 and 47. Therefore, in the grinding process, the pressure applied to the thin-plate glass 44 does not need to be finely adjusted so that the curved portion of the thin-plate glass 44 is prevented from moving. The thin-plate glass 44 can be efficiently ground. The thin-plate glass 44 with a good flatness can be mass-produced.

Additionally, in the latter half of the grinding, the grinding is advanced so that the abutment area of the thin-plate glass 44 and the upper fixed board 46 (lower fixed board 47) is enlarged. Therefore, in the latter half a larger pressure is preferably applied as compared with the former half. In this case, it is preferable that the curvatures of the upper and lower faces of the thin-plate glass 44 be close to each other, because the contact areas with the grinding plate in the upper and lower faces can be close to each other.

Also, the support portion 45 formed on the outer peripheral end portion shown in FIG. 15 may also be formed toward the central portion of the thin-plate glass. The support portion 45 can be easily obtained by forming recess portions in the forming faces of the aforementioned upper, lower and cylindrical dies.

The present invention has been described in the above, but it can be understood that the aforementioned embodiment is only an example. Constitutions of the upper-die and lower-die devices, the number of upper and lower dies, the relationship between the positions of the upper and lower dies and the processes, constitutions of the upper and lower dies can be varied. Also, the temperature of the inner surface of the cylindrical die can be set higher than the surface temperature of each pressing face of the upper and lower dies. Further, it is appropriate that the warp ratio of the thin-plate glass is about 0.001 to 1%. Also, the thin-plate glass may be warped in a constant direction, either upward or downward. Under this warp condition, the thin-plate glass can be ground flat with a high precision in the subsequent lapping/polishing.

As aforementioned, according to the invention, the thin-plate glass with a good flatness can be manufactured with a high mass-productivity. Additionally, a high-quality, high-performance glass substrate for an information recording medium and a magnetic recording medium can be manufactured with a high mass productivity.

What is claimed is:

1. A method for manufacturing a thin plate-shape glass article utilizing a mold having a lower die forming face and a first and a second opposing molding surfaces, comprising the steps of:
    (a) preheating said lower die forming face and said first opposing molding surfaces to a predetermined preheat temperature;
    (b) delivering to said lower die forming face a charge of molten glass of a predetermined volume to form a glass article of desired shape and dimensions;
    (c) bringing said lower die forming face and said first opposing molding surfaces of said mold into close proximity with each other;
    (d) pressing said charge to transfer heat from said charge of molten glass to form an initial thin plate-shape glass article;
    (e) bringing said lower. die forming face and said first opposing molding surfaces of said mold apart with each other when the inside of said initial thin plate-shape glass article maintains a temperature higher than a glass transition point temperature;
    (f) bringing said lower die forming face and either said first opposing or said second opposing surfaces of said mold into close proximity with each other;
    (g) pressing said initial thin plate-shape glass article to transfer heat from said initial thin plate-shape glass article for warp modification of said initial thin plate-shape glass article;
    (h) bringing said lower die forming face and either said first opposing or said second opposing surfaces of said mold apart with each other when the inside of said initial thin plate-shape glass article maintains a temperature higher than said glass transition point temperature; and
    (i) removing said thin plate-shape glass article from said lower die forming face.

2. A method according to claim 1, wherein said step (g) is performed in such a manner that said initial thin plate-shape glass article is pressed under deformable condition by a pair of flat surfaces of said mold.

3. A method for manufacturing a thin plate-shape glass article utilizing a mold having a lower die forming face and a first and a second opposing molding surfaces, comprising the steps of:
    (a) preheating said lower die forming face and said first opposing molding surfaces to a predetermined preheat temperature;
    (b) delivering to said lower forming face die a charge of molten glass of a predetermined volume to form a glass article of desired shape and dimensions;
    (c) bringing said lower die forming face and said first opposing molding surfaces of said mold into close proximity with each other;
    (d) pressing said charge to transfer heat from said charge of molten glass to form an initial thin plate-shape glass article;
    (e) bringing said lower die forming face and said first opposing molding surfaces of said mold apart with each other when the inside of said initial plage-shape glass article maintains a temperature higher than a glass softening point temperature;
    (f) bringing said lower die forming face and either said first opposing or said second opposing surfaces of said mold into close proximity with each other;

(g) pressing said initial thin plate-shape glass article to transfer heat from said initial thin plate-shape glass article for warp modification of said initial thin plate-shape glass article;

(h) bringing said lower die forming face and either said first opposing or said second opposing surfaces of said mold apart with each other when the inside of said initial thin plate shape glass article maintains a temperature higher than said glass transition point temperature; and (i) removing said thin plate-shape glass article from said lower die forming face.

4. A method according to claim 1, wherein said step (d) is terminated when said initial thin plate-shape glass article is kept in a thermally unequilibrium state between one side facing to said first opposing surface and the other side facing to said receiving surface.

5. A method according to claim 1, wherein said method is performed during said charge and said initial thin plate-shape glass article are kept in a thermally unequilibrium state relative to said lower die forming face and either said first or said second opposing surfaces of said mold.

6. A method according to claim 1, further comprising a step of cooling said lower die forming face and said first opposing surfaces of said mold after said step (e) so as to maintain said lower die forming face and said first opposing surfaces to said predetermined preheat temperature.

7. A method for manufacturing a thin plate-shape glass article utilizing a mold having a lower die forming face and opposing molding surfaces which press a charge of molten glass therebetween, wherein there are provided pressure receiving portions which protrude outwardly from each edge of said thin plate-shape glass article and are thicker in thickness than said thin plate-shape glass article.

8. A method according to claim 1, wherein there are provided a plurality of said lower die forming faces, each of said lower die forming faces successively moving to each of predetermined positions where said steps (a)–(i) are performed respectively.

9. A method for manufacturing a glass substrate for an information recording medium, comprising the steps of:
(a) preparing a thin plate-shape glass article obtained by using a method according to claim 1;
(b) grinding a main surface of said thin plate-shape glass article; and
(c) further polishing the main surface of said thin plate-shape glass article.

10. A method for manufacturing a magnetic recording medium, comprising the steps of:
(a) preparing a glass substrate for an information recording medium manufactured by a method according to claim 9; and
(b) forming a magnetic layer on a main surface of said glass substrate.

11. A method for manufacturing a glass substrate for an information recording medium, comprising the steps of:
(a) preparing a thin plate-shape glass article with a curvature state therein obtained by pressing a charge of molten glass;
(b) grinding a main surface of said thin plate-shape glass article; and
(c) further polishing the main surface of said thin plate-shape glass article;
said step (b) including the steps of:
(b1) flattening said thin plate-shape glass article in such a manner that said curvature state is maintained without being deformed; and
(b2) grinding the main surface of said flattened thin plate-shape glass article to remove a predetermined amount of thickness.

12. A method according to claim 11, wherein step (b) is performed in such a manner that a pressure applied to said thin plate-shape glass article is increased continuously or in a stepwise manner during grinding.

13. A method for manufacturing a glass substrate for an information recording medium, comprising the steps of:
(a) preparing a thin plate-shape glass article with a curvature state therein manufactured by pressing at least with a pair of mold dies;
(b) grinding a main surface of said thin plate-shape glass article; and
(c) further polishing the main surface of said thin plate-shape glass article;
said step (b) including the step of:
flattening said thin plate-shape glass article by setting a load pressure of a lapping machine to a value enabling to maintain said curvature state without being deformed.

14. A method for manufacturing a glass substrate for an information recording medium, comprising the steps of:
(a) preparing a thin plate-shape glass article obtained by using a method according to claim 7;
(b) grinding a main surface of said thin plate-shape glass article in such a manner that each of pressure receiving portions of said thin plate-shape glass article receives a pressure applied thereto; and
(c) further polishing the main surface of said thin plate-shape glass article.

15. A method for manufacturing a thin plate-shape glass article utilizing a mold having a lower die forming face and opposing molding surfaces and a pressing die having a predetermined pattern therein, comprising the steps of:
(a) preheating said lower die forming face and opposing molding surfaces to a predetermined heat temperature;
(b) delivering to said lower die forming face a charge of molten glass of a predetermined volume to form a glass article of desired shape and dimensions;
(c) bringing said lower die forming face and opposing molding surfaces of said mold into close proximity with each other;
(d) pressing said charge to transfer heat from said charge of molten glass to form an initial thin plate-shape glass article;
(e) bringing said lower die forming face and opposing molding surfaces of said mold apart with each other when the inside of said initial thin plate-shape glass article maintains a temperature higher than a glass transition point temperature;
(f) bringing said lower die forming face of said mold and said pressing die into close proximity with each other;
(g) pressing said initial thin plate-shape glass article to transfer heat from said initial thin plate-shape glass article to reduce a temperature difference between the upper and the lower surfaces of said initial thin plate-shape glass article when the inside of said initial thin plate-shape glass article maintains a temperature higher than said glass transition point temperature for warp modification of said initial thin plate-shape glass, article.

16. A method according to claim 15, wherein said step (g) is performed in such a manner that said initial thin plate-shape glass article is pressed under deformable condition by a pair of flat surfaces of said pressing die.

* * * * *